United States Patent
Kurane

(10) Patent No.: US 7,881,604 B2
(45) Date of Patent: Feb. 1, 2011

(54) IMAGE RECORDING DEVICE, IMAGE MANAGING SYSTEM, AND IMAGE RECORDING CONTROL PROGRAM

(75) Inventor: Haruhisa Kurane, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 142 days.

(21) Appl. No.: 12/326,574

(22) Filed: Dec. 2, 2008

(65) Prior Publication Data

US 2009/0148152 A1 Jun. 11, 2009

(30) Foreign Application Priority Data

Dec. 5, 2007 (JP) .............................. 2007-314371

(51) Int. Cl.
*G03B 17/24* (2006.01)
*G03B 17/48* (2006.01)

(52) U.S. Cl. ..................................... 396/429; 396/310

(58) Field of Classification Search .................. 396/429
See application file for complete search history.

(56) References Cited

U.S. PATENT DOCUMENTS

| | | | |
|---|---|---|---|
| 6,405,132 B1 * | 6/2002 | Breed et al. | 701/301 |
| 2006/0132602 A1 | 6/2006 | Muto et al. | 348/148 |
| 2006/0199609 A1 * | 9/2006 | Gay | 455/556.1 |
| 2007/0073937 A1 * | 3/2007 | Feinberg et al. | 710/62 |
| 2007/0244634 A1 * | 10/2007 | Koch et al. | 701/207 |
| 2008/0125996 A1 * | 5/2008 | Fitzhugh | 702/89 |
| 2009/0171579 A1 * | 7/2009 | Wu et al. | 701/211 |

FOREIGN PATENT DOCUMENTS

| | | |
|---|---|---|
| JP | A-07-107351 | 4/1995 |
| JP | A-10-300503 | 11/1998 |
| JP | A-2001-257920 | 9/2001 |
| JP | A-2002-330377 | 11/2002 |
| JP | A-2003-304493 | 10/2003 |
| JP | A-2005-6081 | 1/2005 |
| JP | A-2006-238221 | 9/2006 |
| JP | A-2007-243551 | 9/2007 |

* cited by examiner

*Primary Examiner*—Clayton E Laballe
*Assistant Examiner*—Bret Adams
(74) *Attorney, Agent, or Firm*—Oliff & Berridge, PLC

(57) ABSTRACT

An image recording device that includes: a photographing condition information storing unit that stores photographing condition information including information of an area in which an image is photographed and information of a period of time in which the image is photographed; photographing control means that allows the photographing unit to photograph an image when it is determined that current location information acquired by the location information acquisition unit and current time information acquired by the time information acquisition unit satisfy a condition shown in the photographing condition information stored in the photographing condition information storing unit; and image recording means that records local image data, and allowing the local image data to correspond to recording content information including information of an area in which the photographing is executed and time information acquired by the time information acquisition unit in a photographing period.

13 Claims, 13 Drawing Sheets

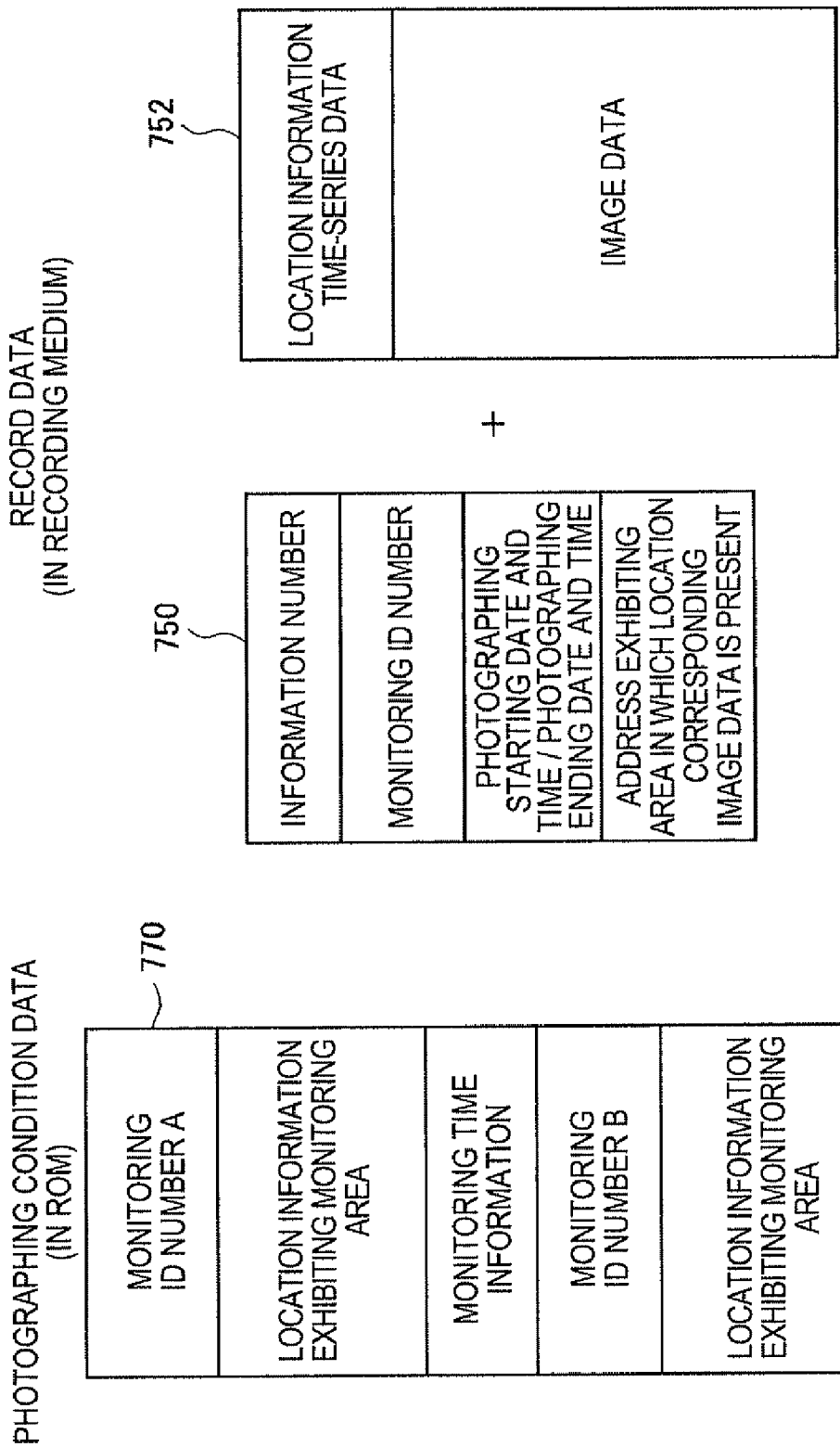

IMAGE RECORDING DEVICE, IMAGE MANAGING SYSTEM, AND IMAGE RECORDING CONTROL PROGRAM

BACKGROUND

1. Technical Field

Several aspects of the present invention relate to an image recording device that takes an image and records the image obtained by the recording. Especially, the present invention relates to an image recording device and an image recording control program capable of photographing a desired area at a desired time and recording image data obtained by the photographing; and an image managing system provided with the image recording device.

2. Related Art

Crimes targeting children, elderly people, and women have often happened to be a social problem. Atrocious crimes such as arson, sneak thieves, and assailing thieves are also unending. Therefore, areas where surveillance cameras are installed have been increased so as to achieve a successful outcome such as rapid capture of a criminal and crime prevention.

However, the installing surveillance cameras disadvantageously needs a high cost due to installing power supply facilities, cameras, and a communication infrastructures. In addition, there is a problem to decide installation areas (only public areas) for cameras, and there is such problem that if a criminal notices a presence of cameras, the criminal may take measures so as to circumvent the cameras. Further, even a patrol by police, guards, and community residents has a limitation to man-hours and costs.

In the United States, surveillance cameras are installed on patrol cars (vehicle). Japan also has a plan to install surveillance cameras on all patrol cars. Vehicles (cars) have a power supply facility (battery), and a vehicle holder can decide whether a camera is installed or not. Further, cameras have been miniaturized so as not to interrupt a driver. The cameras installed in vehicles are cheaper than fixed cameras. Expanding this usage, the cameras may be installed in taxies, buses, vehicles for door-to-door delivery, vehicles for delivering mails and newspapers, office cars, company cars, and regular cars. Especially, taxies and vehicles for door-to-door delivery transfer various areas day and night. Since the socially vulnerable such as children, elementary school pupils, and elderly people uses buses and taxis, these vehicles may witness (record) a crime even when a driver of the vehicles does not notice it.

Due to the development of electronics, a drive recorder has started to be mounted on a vehicle. This apparatus records a state at the time that an accident happens. The apparatus records and stores image data for thirty seconds before and after the accident. Commonly, the apparatus starts taking an image of the circumference due to a rapid change, which is a trigger of taking an image, of a vehicle speed detected by an acceleration sensor and stores the image data.

There is a service using positioning information obtained by using radio waves from a global positioning system (GPS) satellite, as used in a car navigation system and a navigation system of a cellular phone. It is not an exaggeration to say that location measurement by using GPS is a usual practice. According to a camera system disclosed in JP-A-2001-257920, for example, a camera is controlled based on location information determined depending on a radio wave received from the GPS satellite, being able to take an image at a desired time interval at a position that is stored in advance.

Further, there is a concept of a probe car. According to the concept, information of various sensors mounted on the car is sent to a host system by using a network system and the data is re-used. For example, a jam-up state can be figured out.

However, in the above example, the photographing is automatically started when the camera reaches a photographing point that is set, so that the photographing is disadvantageously executed at a photographing point and the data is stored even in an undesired state such as the middle of the night. Consequently, unnecessary data may compress storage capacity of a recording medium or eliminating the unnecessary data may require extra effort.

SUMMARY

An advantage of the present invention is to provide an image recording device, an image recording control program, and an image managing system provided with the image recording device that photographs an image in a desired area at a desired time and records image data obtained by the photographing.

An image recording device, according to a first aspect of the invention, that records image data in a recording medium includes: a photographing unit capable of photographing an image so as to provide the image data; a location information acquisition unit for acquiring location information; a time information acquisition unit for acquiring time information; a photographing condition information storing unit that stores photographing condition information including information of an area in which an image is photographed and information of a period of time in which the image is photographed; photographing control means that allows the photographing unit to photograph an image when it is determined that current location information acquired by the location information acquisition unit and current time information acquired by the time information acquisition unit satisfy a condition shown in the photographing condition information stored in the photographing condition information storing unit; and image recording means that records local image data, the local image data being obtained by the photographing, in the recording medium in a manner allowing the local image data to correspond to recording content information including information of an area in which the photographing is executed and time information acquired by the time information acquisition unit in a photographing period.

In such configuration, once the location information acquisition unit acquires current location information and the time information acquisition unit acquires current time information, the photographing control means compares the location information and the time information that are acquired to the photographing condition information that is stored in the photographing condition information storing unit so as to determine whether the location information and the time information satisfy conditions shown in the photographing condition information or not. In particular, the photographing control means determines whether a location shown in the current location information that is acquired is within an area shown in information, which is included in the photographing condition information, of an area in which the photographing is executed, and whether time shown in the current time information that is acquired is within a period of time shown in information of a period of time at which the photographing is executed or not. If the current location is within the area mentioned above and the current time is within the period of time mentioned above, it is determined that the conditions are satisfied. If the photographing control means determines that the conditions are satisfied, the photographing control means allows the photographing unit to execute the photographing. If the photographing is executed, the image information recording means records the image data that is obtained by the photographing as local image data in the recording medium in a manner allowing the local image data to correspond to information of an area which is photographed and time information acquired by the time information acquisition unit in the photographing period of time.

For example, the image recording device of the aspect is installed on a vehicle and photographing condition information including information of a desired area in which photographing is executed and information of a desired period of time in which the photographing is executed is stored in photographing condition information storing unit. Accordingly, when the vehicle travels to the area shown in the photographing condition information (the traveling is judged from the location information acquired by the location information acquisition unit) and the current time is within the period of time shown in the condition information (the time is judged from the time information acquired by the time information acquisition unit), the photographing can be executed by the photographing unit. At this time the user may arbitrarily set an installing position, a photographing direction, and a photographing range of the photographing unit (may determine in advance).

That is, the image recording device executes photographing based on not only information of an area in which the photographing is executed but also information of a period of time in which the photographing is executed, so that unnecessary photographing (photographing in an undesired period of time) and unnecessary recording of local image data can be prevented. Accordingly, the local image data can be efficiently recorded in the recording medium. Further, unnecessary local image data is not recorded, so that a trouble of deleting unnecessary image data is decreased advantageously.

Here, the location information acquisition unit receives radio waves from a global positioning system (GPS) satellite, for example, and acquires location information from the radio waves that are received. Further, an error of the location information obtained by the radio waves from the GPS satellite may be corrected by radio waves that are received from a base station of a differential GPS (DGPS), and the location information after the information is corrected may be acquired. In a case where the image recording device of the aspect is installed on a vehicle provided with equipment having measurement function such as a car navigation system, the location information may be acquired through the car navigation system. The description hereinafter is common to an image management system of a second aspect, an image recording control program of the third aspect and a fourth aspect, and an image recording control method of a fifth aspect and a sixth aspect.

The time information acquisition unit corresponds to, for example, a structure that is provided with a clock chip, which is driven by an internal battery, such as a real time clock (RTC) and acquires time information from the chip, a structure that receives radio waves from a GPS satellite and acquires time information from the received radio waves, and a structure that acquires time information from a server which provides the time information on an internet. Here, the time information includes at least information of hour and minute and information of either of second, year, month, and day is added to the information of hour and minute depending on purpose or demand (for example, a combination of month, day, hour, and minute (January 15, 10:30,etc.)). The description hereinafter is common to the image management system of the second aspect, the image recording control program of the third aspect and the fourth aspect, and the image recording control method of the fifth aspect and the sixth aspect.

Further, the recording medium is a nonvolatile rewritable medium, and examples of the recording medium include a detachable card-type recording medium, and a recording medium having relatively great capacity such as HDD. A detachable HDD device is also applicable. The description hereinafter is common to the image management system of the second aspect, the image recording control program of the third aspect and the fourth aspect, and the image recording control method of the fifth aspect and the sixth aspect.

An image managing system according to a second aspect of the invention, includes a movable body equipped with an image recording device, which includes a photographing unit capable of photographing an image and recording image data obtained by the photographing by the photographing unit in a recording medium; and an information processing device managing the image data that is recorded in the image recording device. In the system, the image recording device and the information processing device are data-communicably coupled to each other through a predetermined communication line. The image recording device includes: a location information acquisition unit for acquiring location information; a time information acquisition unit for acquiring time information; a photographing condition information storing unit that stores photographing condition information including information of an area in which an image is photographed and information of a period of time in which the image is photographed; photographing control means that allows the photographing unit to photograph an image when it is determined that current location information acquired by the location information acquisition unit and current time information acquired by the time information acquisition unit satisfy a condition shown in the photographing condition information stored in the photographing condition information storing unit; image recording means that records local image data, the local image data being obtained by the photographing, in the recording medium in a manner allowing the local image data to correspond to recording content information including information of an area in which the photographing is executed and time information obtained by the time information acquisition unit in a photographing period; and image data transmitting means that transmits the local image data, the local image data being recorded by the image recording means, through the predetermined communication line in accordance with an acquisition request for the local image data, which is received from the information processing device through the predetermined communication line. The information processing device includes: image acquisition request transmitting means that transmits the acquisition request for the local image data to the image recording device through the predetermined communication line; image data receiving means that receives the local image data transmitted from the image recording device through the predetermined communication line; and image data storing means that stores the local image data that is received.

In such configuration, in the image recording device, once the location information acquisition unit acquires current location information and the time information acquisition unit acquires current time information, the photographing control means compares the location information and the time information that are acquired to the photographing condition information that is stored in the photographing condition information storing unit so as to determine whether the location information and the time information satisfy conditions shown in the photographing condition information or not. In particular, the photographing control means determines whether a location shown in the current location information that is acquired is within an area shown in information, which is included in the photographing condition information, of an area in which the photographing is executed, and whether time shown in the current time information that is acquired is within a period of time shown in information of a period of time at which the photographing is executed or not. If the current location is within the area shown in the photographing condition information and the current time is within the period of time shown in the photographing condition information, it is determined that the conditions are satisfied If the photographing control means determines that the conditions are satisfied, the photographing control means allows the photographing unit to execute the photographing. If the photographing is executed, the image information recording means records the image data that is obtained by the photographing as local image data in the recording medium in a manner allowing the image data to correspond to information of an area which is photographed and time information acquired by the time information acquisition unit in the photographing period of time.

On the other hand, in the information processing device, the image acquisition request transmitting means produces an acquisition request of the local image data that is recorded in the image recording device, and the acquisition request that is produced is transmitted to the image recording device through a predetermined communication line. The local image data is recorded in a manner corresponding to the information of the photographed area and the photographed period of time, so that the local information and the time information can be used as an index. The information processing device allows the acquisition request to include the index information so as to be able to produce and transmit an acquisition request of desired local image data.

If the image recording device receives the acquisition request of the local image data that is transmitted from the information processing device through the predetermined communication line, the image recording device reads out the local image data corresponding to the acquisition request from the recording medium and transmits the local image data that is read out to the information processing device by the image data transmitting means through the predetermined communication line.

The information processing device receives the local image data, which is transmitted from the image recording device, by the image data receiving means through the predetermined communication line. Further, the local image data that is received is stored in the image data storing means.

Therefore, if photographing condition information including information of a desired area in which the photographing is executed and information of a desired period of time in which the photographing is executed is stored in photographing condition information storing unit, the photographing can be executed by the photographing unit when the movable body travels to the area shown in the photographing condition information (the traveling is judged from the location information acquired by the location information acquisition unit) and the current time is within the period of time shown in the condition information (the time is judged from the time information acquired by the time information acquisition unit). At this time, the user may arbitrarily set an installing position, a photographing direction, and a photographing range of the photographing unit (may determine in advance).

That is, the image recording device executes photographing based on not only information of an area in which the photographing is executed but also information of a period of time in which the photographing is executed, so that unnecessary photographing (photographing in an undesired period of time) and unnecessary recording of local image data can be prevented. Accordingly, the local image data can be efficiently recorded in the recording medium. Further, unnecessary local image data is not recorded, so that a trouble of deleting unnecessary image data is decreased advantageously.

Further, the local image data that is recorded in the image recording device can be transmitted to the information processing device externally positioned in accordance with the acquisition request from the information processing device so as to store the image data by the image data storing means included in the information processing device. Therefore, the local image data obtained by photographing by the image recording device installed on the movable body can be managed (browse, compilation, and analysis, for example) by the information processing device remotely positioned from the movable body.

Here, examples of the predetermined communication line mentioned above include a radio communication line, a wire communication line, and a communication line in which the above two lines are mixed. Since the image recording device of the aspect is installed on the movable body, it is preferable that the image recording device be coupled to a nearest base station by a radio communication line especially in a case where the information processing device is remotely positioned. Here, the base station may be coupled to the information processing device by any of radio-, wire-, and mixed-communication line. Further, if the information processing device is a mobile terminal (a mobile phone, a personal digital assistance (PDA), and a note PC, for example), a near field communication line employing infrared rays or Blue Tooth, or a wire communication line such as LAN cable that is directly connected. The description hereinafter is common to the image recording control program of the fourth aspect and the image recording control method of the sixth aspect.

The movable body is, for example, a car, a vessel, and an air carrier that travel in an inhabited or uninhabited region in which location measurement can be executed by a measurement means such as GPS. The description hereinafter is common to the image recording control program of the fourth aspect and the image recording control method of the sixth aspect.

In the image managing system of the second aspect, the photographing control means may allow the photographing unit to end the photographing when at least one of the current location information acquired by the location information acquisition unit and the current time information acquired by the time information acquisition unit disagrees with a condition shown in the photographing condition information, and the image recording means may record the image data as the recording content information in a manner allowing information including information of an area in which the photographing is executed and information, which is acquired by the time information acquisition unit, of starting time and ending time of the photographing to correspond to the image data.

In such configuration, the photographing control means allows the photographing unit to end photographing when at least one of the current location or the current time that are acquired does not satisfy the conditions of an area and time that are shown in the photographing condition information. At the same time, the time information acquisition unit acquires photographing starting time and photographing ending time and the image recording means records the local image data obtained by the photographing in the recording medium in a manner allowing the local image data to correspond to the photographing starting time and the photographing ending time that are acquired.

Accordingly, the photographing content information including the information of the area in which the photographing is executed, the photographing starting time, and the photographing ending time can be used as an index, so that desired local image data can be easily detected and read out from the recording medium.

In the image managing system of the second aspect, the acquisition request may include photographing content information.

In such configuration, the information processing device can acquire the local image data including desired photographing content from the image recording device. Thus the local image data can be efficiently acquired.

In the image managing system of the second aspect, the image recording device may include access limitation means that imposes an access limitation with respect to record data recorded in the recording medium in accordance with a protection request that is received from the information processing device through the predetermined communication line and is an indication request of protection with respect to the record data, and the information processing device may include protection request transmitting means that transmits the protection request to the image recording device through the predetermined communication line.

In such configuration, access limitation can be imposed on the local image data that is recorded in the recording medium. Therefore, when the image recording device has local image data that is desired to be acquired by the information processing device, access limitation such as overwriting inhibition on the data or access inhibition to the data by people other than the administrator of the information processing device can be imposed. Accordingly, a user of the movable body or a third party is prevented from arbitrarily deleting important data that is recorded in the recording medium and should not be deleted or from overwriting on the data for recording other data.

The image managing system of the second aspect, the image recording device may include record data deleting means that deletes record data recorded in the recording medium, after the record data on which the access limitation is imposed is transmitted.

In such configuration, in a case where the image recording device is used for photographing an image in an area and time that are desired to be managed by the administrator of the information processing device and are unnecessary for the user of the movable body, the local image data is (automatically) deleted from the recording medium of the image recording device after the data is transmitted to the information processing device. Therefore, unnecessary local image data can be prevented from compressing the storage capacity of the recording medium.

In the image managing system of the second aspect, the image recording device may include a migration velocity information acquisition unit for acquiring information of a migration velocity of the movable body, and the photographing control means may control a frame rate in the photographing by the photographing unit based on the information of the migration velocity that is acquired by the migration velocity information acquisition unit.

In such configuration, if the migration velocity information acquisition means acquires velocity information, the photographing control means controls the frame rate in the photographing of the photographing unit based on the velocity information that is acquired. For example, the photographing control means controls the frame rate such that the frame rate is decreased when the velocity of the movable body is relatively low, and the frame rate is increased when the velocity of the movable body is relatively high. Accordingly, images having appropriate quality can be photographed and a data amount of the image data recorded in the recording medium can be decreased compared to a case where the frame rate is equalized.

In the image managing system of the second aspect, the image recording device may include an operation information acquisition unit for acquiring operation information according to an operation of the movable body and accident predicting means that predicts an occurrence of an accident with respect to the movable body based on the operation information acquired by the operation information acquisition unit. In the system, the photographing control means may allow the photographing unit to photograph an image in a predetermined period of time when the accident predicting means predicts an occurrence of an accident. Further, in the system, the image recording means may record accident prediction image data, which is obtained by the photographing, in the recording medium in a manner allowing the accident prediction image data to correspond to at least location information acquired by the location information acquisition unit and time information acquired by the time information acquisition unit.

In such configuration, if the operation information acquisition unit acquires operation information, the accident occurrence predicting means predicts an occurrence of an accident based on the operation information that is acquired. In a case where the occurrence of an accident is predicted, the photographing control means allows the photographing unit to photograph an image for a predetermined period of time (30 seconds before and after the occurrence of an accident, for example). The image recording means records accident prediction image data that is obtained by the photographing in the recording medium in a manner allowing the accident prediction image data to correspond to the location information acquired by the location information acquisition unit and the time information acquired by the time information acquisition unit in the photographing period.

That is, the image recording device can serve as a drive recorder.

Here, the operation information acquisition unit is provided with an acceleration sensor, a gyroscope, and the like. The operation information is, for example, information of acceleration detected by the acceleration sensor and information of the posture of the movable body that is detected by the gyroscope and the like. The accident predicting means predicts occurrence of an accident when the acceleration obtained by the acceleration sensor rapidly changes, for example.

In the image managing system of the second aspect, the image recording device may include update request receiving means that receives an update request of the photographing condition information through the predetermined communication line, and photographing condition updating means that updates the photographing condition information stored in the photographing condition information storing unit in accordance with the update request received at the update request receiving means. Further, in the system, the information processing device may include update request transmitting means that transmits an update request of the photographing condition information including an update content of the photographing condition information to the image recording device through the predetermined communication line.

In such configuration, the photographing condition information that is stored in the photographing condition information storing unit of the image recording device can be updated from a predetermined device that is remotely positioned.

For example, the administrator managing the local image data can update the photographing condition information that is stored in the photographing condition information storing unit of the image recording device installed on the movable body into information including a desired area and time with a device remotely positioned.

That is, the photographing condition information can be remotely updated and the photographing area and time can be freely changed in accordance with an occurrence of an event and the like.

For example, in a case where a hit-and-run accident occurs, an update request is transmitted to the image recording device corresponding to the system of the aspect and installed on a vehicle traveling around an accident outbreak site. Thus the photographing condition information stored in the photographing condition information storing unit is updated into photographing condition information including information of an area including a route on which the criminal is seemed to flee from the site and information of time in which a vehicle of the criminal flees, enhancing a searching net for the fleeing vehicle.

In the image managing system of the second aspect, the movable body may be a vehicle, the information processing device may be managed by police, information on an area in which the photographing is executed may include information on an area in which a crime rate is relatively high, and information on a period of time in which the photographing is executed may include information on a period of time in which a crime rate is relatively high.

In such configuration, a patrol car, a taxi, a bus, or a vehicle for door-to-door delivery can be selected as a vehicle equipped with the image recording device, information of an area in which the photographing is executed can include information of an area of which an incidence rate of crimes such as abduction or arson is high within the traveling range of the vehicle, and information of a period of time in which the photographing is executed can include information of a period of time in which the crime rate is high.

Accordingly, when the vehicle travels to the area shown in the photographing condition information and the current time is within the time period shown in the condition, the photographing unit photographs an image around the vehicle and local image data obtained by the photographing can be recorded in the recording medium in a manner allowing the local image data to correspond to the information of the area which is photographed and the information of time within the photographing period (for example, photographing starting time and photographing ending time). Further, the local image data recorded in the recording medium can be transmitted to the information processing device through a predetermined communication line in accordance with an acquisition request from the information processing device managed by police.

Accordingly, an area in which a crime seems to occur can be monitored, and an image of the area is photographed when a crime occurs in the photographing period of time and the image data can be recorded. Namely, the system of the aspect can be used for prevention of a crime by its monitoring and used for rapid resolution of a case by its image data at occurrence of a crime.

An image recording control program, according to a third aspect of the invention, executed in an image recording device including: a photographing unit that is capable of photographing an image; a photographing condition information storing unit that stores photographing condition information including information of an area in which an image is photographed and information of a period of time in which the image is photographed, and a micro computer, and recording image data obtained by the photographing by the photographing unit in a recording medium, includes: a program for allowing the micro computer to execute a processing including: (a) acquiring location information; (b) acquiring time information; (c) photographing-controlling so as to allow the photographing unit to photograph an image when it is determined that current location information acquired in the step (a) and current time information acquired in the step (b) satisfy a condition shown in the photographing condition information stored in the photographing condition information storing unit; and (d) recording local image data, the local image data being obtained by the photographing, in the recording medium in a manner allowing the local image data to correspond to recording content information including at least information of an area in which the photographing is executed and time information obtained in the step (b) in a photographing period.

In such configuration, if the micro computer reads out a program and executes a processing in accordance with the program that is read out, an advantageous effect same as that of the image recording device of the first aspect can be obtained.

An image recording control program, according to a fourth aspect of the invention, executed by an image recording device in an image managing system including: a movable body and an information processing device, the movable body being equipped with the image recording device, the image recording device including: a photographing unit that is capable of photographing an image; a photographing condition information storing unit storing photographing condition information including information of an area in which an image is photographed and information of a period of time in which an image is photographed; and a micro computer, and recording image data obtained by the photographing by the photographing unit in a recording medium, and the information processing device managing the image data that is recorded by the image recording device and being data-communicably coupled to the image recording device through a predetermined communication line, includes: a program for allowing the micro computer to execute a processing including: (e) acquiring location information; (f) acquiring time information; (g) photographing-controlling so as to allow the photographing unit to photograph an image when it is determined that current location information acquired in the step (e) and current time information acquired in the step (f) satisfy a condition shown in the photographing condition information stored in the photographing condition information storing unit; (h) recording local image data, the local image data being obtained by the photographing by the photographing unit, in a recording medium in a manner allowing the local image data to correspond to content information including at least information of an area in which the photographing is executed and time information acquired in the step (f) in a photographing period; (i) receiving an acquisition request of the local image data from the information processing device through the predetermined communication line; and (j) transmitting the local image data recorded in the step (h) through the predetermined communication line in accordance with the acquisition request that is received in the step (i).

In such configuration, if the micro computer reads out a program and executes a processing in accordance with the program that is read out, an advantageous effect same as that of the image recording device in the image managing system of the second aspect can be obtained.

An image recording control method, according to a fifth aspect of the invention, used in an image recording device including a photographing unit that is capable of photographing an image and a photographing condition information storing unit storing photographing condition information including information of an area in which an image is photographed and information of a period of time in which an image is photographed, and recording image data obtained by the photographing by the photographing unit in a recording medium, includes: (k) acquiring location information; (l) acquiring time information; (m) photographing-controlling so as to allow the photographing unit to photograph an image when it is determined that current location information acquired in the step (k) and current time information acquired in the step (l) satisfy a condition shown in the photographing condition information stored in the photographing condition information storing unit; and (n) recording local image data, the local image data being obtained by the photographing, in the recording medium in a manner allowing the local image data to correspond to recording content information including at least information of an area in which the photographing is executed and time information obtained in the step (l) in a photographing period.

Accordingly, an advantageous effect same as that of the image recording device of the first aspect can be obtained.

An image recording control method, according to a sixth aspect of the invention, used in an image recording device in an image managing system that includes: a movable body and an information processing device, the movable body being equipped with the image recording device, the image recording device including a photographing unit that is capable of photographing an image and a photographing condition information storing unit storing photographing condition information including information of an area in which an image is photographed and information of a period of time in which an image is photographed, and recording image data obtained by the photographing by the photographing unit in a recording medium, and the information processing device managing the image data that is recorded by the image recording device and being data-communicably coupled to the image recording device through a predetermined communication line, includes: (o) acquiring location information; (p) acquiring time information; (q) photographing-controlling so as to allow the photographing unit to photograph an image when it is determined that current location information acquired in the step (o) and current time information acquired in the step (p) satisfy a condition shown in the photographing condition information stored in the photographing condition information storing unit; (r) recording local image data, the local image data being obtained by photographing by the photographing unit, in a recording medium in a manner allowing the local image data to correspond to recording content information including at least information of an area in which the photographing is executed and time information acquired in the step (p) in a photographing period; (s) receiving an acquisition request of the local image data from the information processing device through the predetermined communication line; and (t) transmitting the local image data recorded in the step (r) through the predetermined communication line in accordance with the acquisition request that is received in the step (s).

Accordingly, an advantageous effect same as that of the image recording device in the image managing system of the second aspect can be obtained.

BRIEF DESCRIPTION OF THE DRAWINGS

The invention will be described with reference to the accompanying drawings, wherein like numbers reference like elements.

FIG. 13A is a diagram illustrating photographing condition data, and FIG. 13B is a diagram illustrating a recording content of local image data.

DESCRIPTION OF EXEMPLARY EMBODIMENT

An image recording device, an image managing system, an image recording control program, and an image recording control method will be described with reference to the accompanying drawings. FIGS. 1 to 13B are diagrams showing an embodiment of the image recording device, the image managing system, the image recording control program, and the image recording control method according to the present invention.

Figure 1:
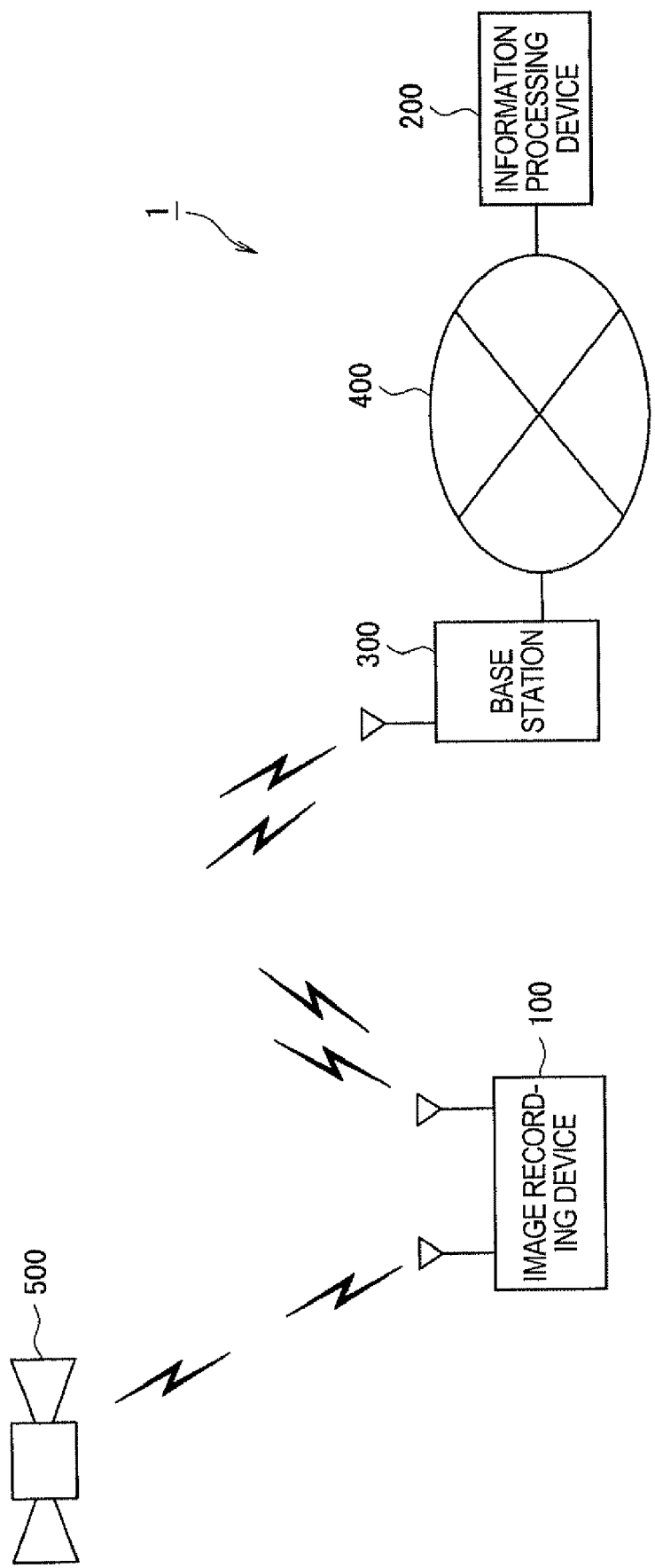
FIG. 1 is a block diagram showing a schematic configuration of an image managing system I according to the invention.

A schematic configuration of an image managing system 1 of the embodiment will be described with reference to FIG. 1. FIG. 1 is a block diagram showing a schematic configuration of the image managing system 1 according to the embodiment.

This image managing system 1 includes an image recording device 100, an information processing device 200, a base station 300, and a network 400. The image recording device 100 photographs an image in a predetermined area at a predetermined period of time, predicts an accident and photographs an image when an occurrence of an accident is predicted, and records image data obtained by the photographing in a recording medium. The information processing device 200 controls a record processing of the image recording device 100, and acquires the image data recorded at the image recording device 100 to manage the data. The base station 300 is a base station of a cellular phone.

The image recording device 100 and the information processing device 200 are coupled to each other through the base station 300 and the network 400 so as to mutually carry out data communication. The image recording device 100 is structured to be able to receive radio waves from a global positioning system (GPS) satellite 500 for measurement of location information.

FIG. 1 shows only one image recording device 100, but the image managing system 1 may include one to a plurality of image recording devices 100 depending on purposes. The image recording device 100 is installed on a movable body such as an air carrier, a vessel, and a car to be used. The image recording device 100 is practically included in the system in a manner being installed on the movable body.

Further, FIG. 1 shows only one information processing device 200, but the image managing system 1 includes a plurality of information processing devices 200 depending on the number of movable bodies on which the image recording device 100 is installed.

A hardware configuration of the image recording device 100 will be described with reference to FIG. 2.

Figure 2:
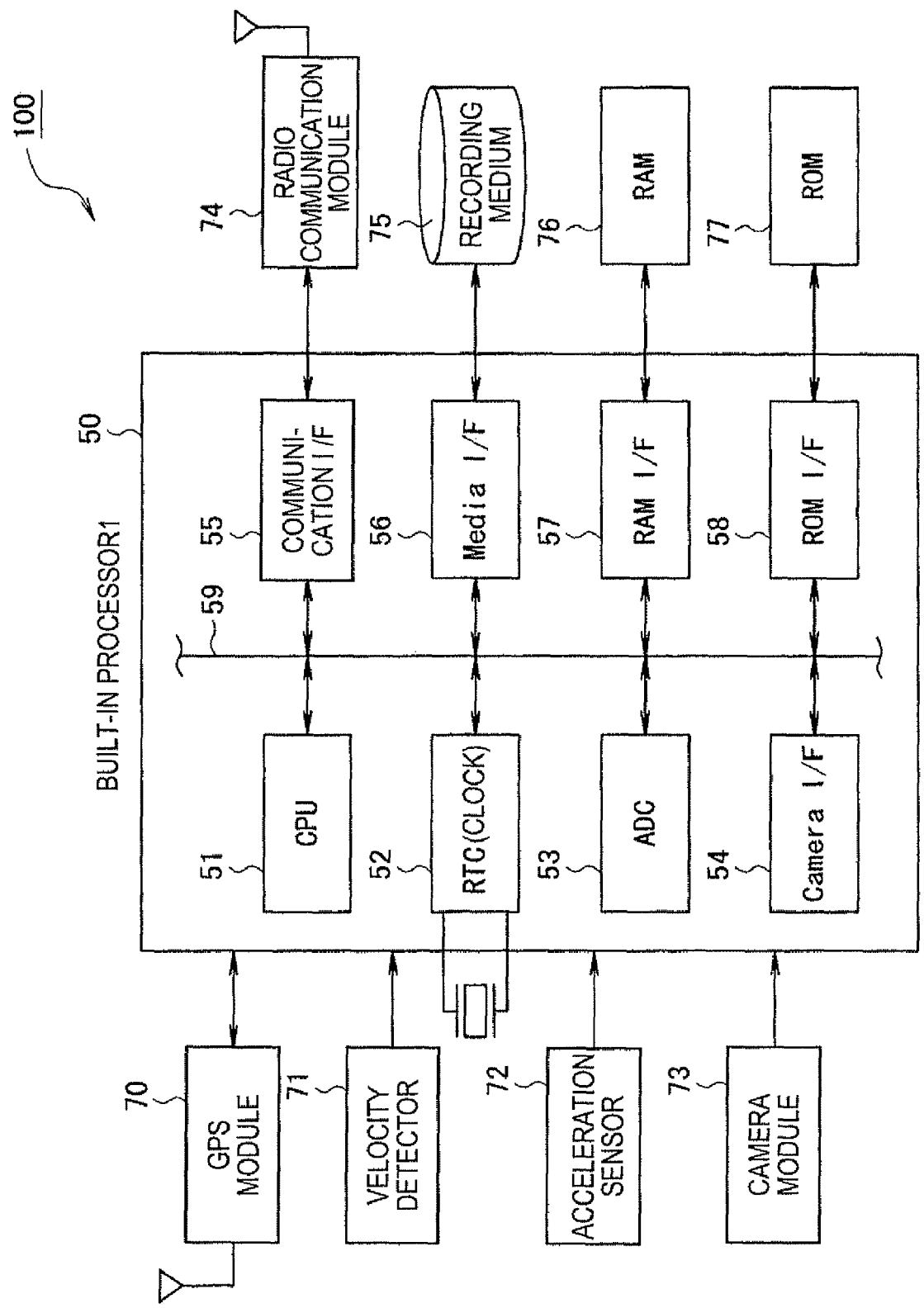
FIG. 2 is a block diagram showing a hardware configuration of an image recording device 100.

FIG. 2 is a block diagram showing the hardware configuration of the image recording device 100.

Referring to FIG. 2, the image recording device 100 includes: a built-in processor 50, a GPS module 70, a velocity detector 71, an acceleration sensor 72, a camera module 73, a radio communication module 74, a recording medium 75, a random access memory (RAM) 76, and a read only memory (ROM) 77.

The built-in processor 50 includes a central processing unit (CPU) 51, a real time clock (RTC) 52, an analog to digital converter (ADC) 53, and a camera interface (I/F) 54. The CPU 51 executes various programs stored in the recording medium 75, the ROM 77, and the like. The RTC 52 is a chip having a clock function for measuring time and a date. The ADC 53 is a chip having a function for converting analog data to digital data. The camera I/F 54 enables the built-in processor 50 and the camera module 73 to transmit and receive data to and from each other.

The built-in processor 50 further includes: a communication I/F 55, a Media I/F 56, a RAM I/F 57, and a ROM I/F 58. The communication I/F 55 enables the built-in processor 50 and the radio communication module 74 to transmit and receive data to and from each other. The Media I/F 56 enables the built-in processor 50 and the recording medium 75 to transmit and receive data to and from each other. The RAM I/F 57 enables the built-in processor 50 and the RAM 76 to transmit and receive data to and from each other. The ROM I/F 58 enables the built-in processor 50 and the ROM 77 to transmit and receive data to and from each other.

Components (51 to 58) of the built-in processor 50 are coupled to each other through buses 59 so as to be able to transmit and receive data to and from each other.

The GPS module 70 receives radio waves from the GPS satellite 500 and acquires current location information of the image recording device 100 based on the radio waves that are received. Therefore, the GPS module 70 is provided with an antenna for receiving radio waves from the GPS satellite 500.

The velocity detector 71 receives a velocity signal from a movable body in a case where the movable body has a velocity detecting function, so as to detect velocity information from the velocity signal. In a case where the movable body does not have the velocity detecting function, the velocity detector 71 acquires information from a propeller of the movable body and rotating velocity information of a driving part that is rotary-driven by the propeller, for example, and detects velocity information of the movable body from the acquired information.

The acceleration sensor 72 detects acceleration that is applied to the movable body. For example, the acceleration sensor 72 detects acceleration based on deformation of a spring, a change of vibration, and the like when the acceleration is increased.

The camera module 73 includes a video camera capable of photographing an image, a mechanism for turning the video camera, and the like. In the embodiment, the video camera is a digital video camera including an image sensor, a lens, an electric shutter mechanism, and an image processing circuit The image sensor has a C-MOS type imaging element. The lens focuses light from an object on the imaging element. The electric shutter mechanism controls exposing time. The image processing circuit produces pick-up image data (color image digital-data) from pixel data (digital RAW data) outputted from the image sensor. The digital video camera is capable of shooting a still image.

The radio communication module 74 has a radio-communicating function same as that of related art mobile phones that are connectable by radio to a packet switch network such as an internet. Thus the radio communication module 74 gets connected to the base station 300 by radio communication in accordance with a command from the CPU 51 so as to transmit and receive data to and from the information processing device 200, which is coupled to the network 400, through the base station 300. Therefore, the radio communication module 74 is provided with an antenna for ratio communication.

The recording medium 75 mainly records image data obtained by photographing by the camera module 73, and is a hard disk drive (HDD) that has relatively high capacity, a detachable nonvolatile memory (to be a set with a memory drive) having a card shape, or the like.

The RAM 76 is a nonvolatile memory, and is used when the CPU 51 executes a program stored in the ROM 77. The RAM 76 loads a program stored in the ROM 77, data required for executing the program, and the like.

The ROM 77 is a nonvolatile memory, and stores various programs for controlling an operation of the image recording device 100 and data required for executing the programs.

Concretely, the ROM 77 stores not only various control programs but also photographing condition data that is a combination of information of an area in which the camera module 73 photographs an image, and information of a period of time in which the image is taken; a threshold amount with respect to acceleration for predicting an occurrence of an accident; and the like.

Here, the photographing condition data includes an ID number that is set for each photographing condition; location information for identifying an area in which the photographing is executed; and information of a period of time in which the photographing is executed. The photographing condition data is not limited to correspond to one area, but the ROM 77 sometimes stores a plurality of photographing condition data corresponding to a plurality of areas and times.

A functional configuration of the image recording device 100 will now be described with reference to FIG. 3.

Figure 3:
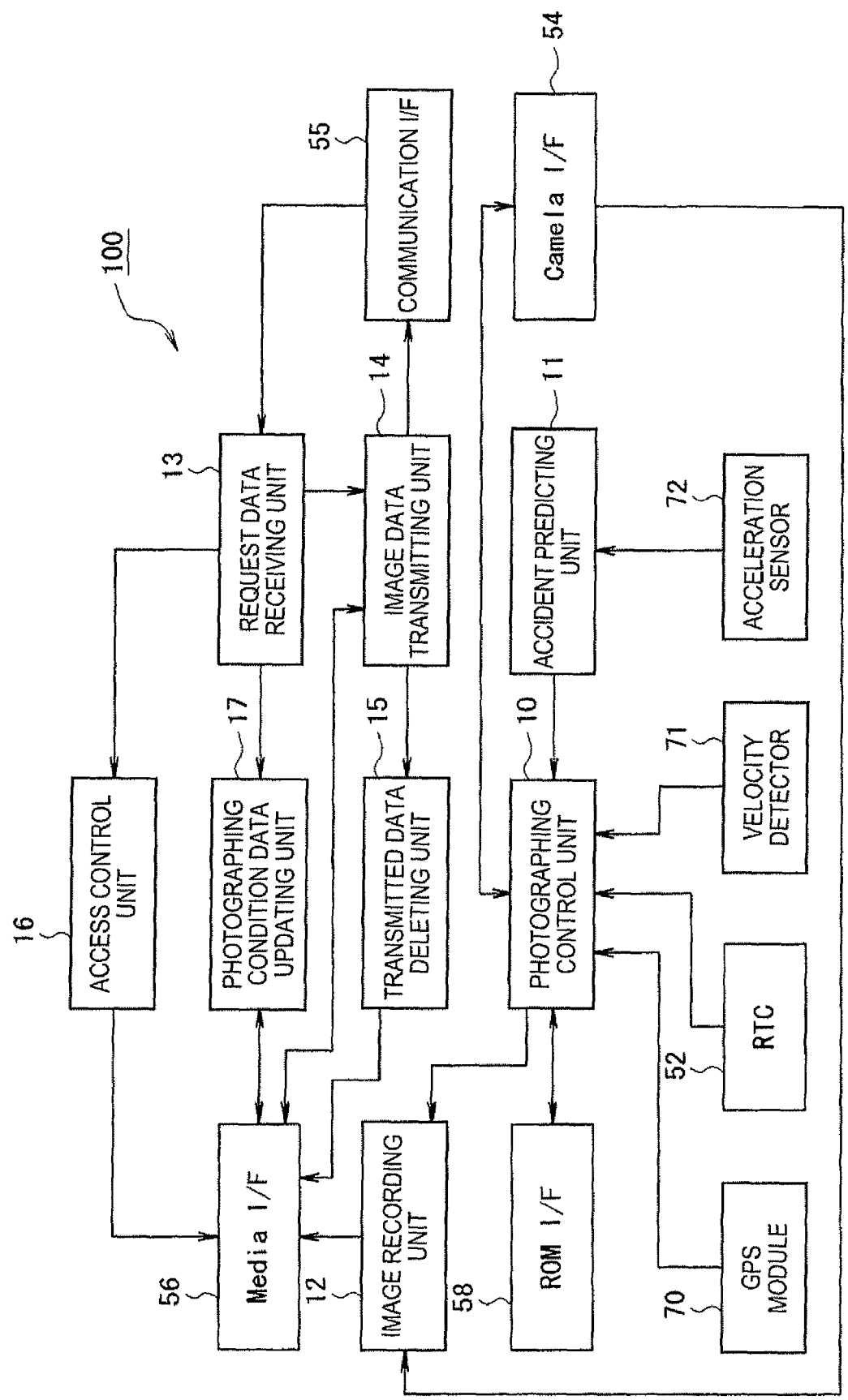
FIG. 3 is a block diagram showing a functional configuration of the image recording device 100.

FIG. 3 is a block diagram showing the functional configuration of the image recording device 100.

Referring to FIG. 3, as the functional configuration, the image recording device 100 includes: a photographing control unit 10, an accident predicting unit 11, an image recording unit 12, a request data receiving unit 13, an image data transmitting unit 14, a transmitted data deleting unit 15, an access control unit 16, and a photographing condition data updating unit 17. Note that these units are not hardware units but functional units.

In the photographing control unit 10, location information (e.g. 2521, Okita-town, Suwa-city, Nagano-prefecture) inputted from the GPS module 70 and time information (e.g. Aug. 28, 2008, 10:20) inputted from the RTC 52 are compared to photographing condition data so as to determine whether the location information and the time information satisfy conditions shown in the photographing condition data. In a case where the location information and the time information satisfy the conditions, a command is given to the camera module 73 through the Camera I/F 54 so as to allow the camera module 73 to start photographing an image. An image that is photographed changes depending on a setting position, an aspect (photographing direction), and an angle of field (type of lens) of the camera module 73 with respect to the movable body. The position, the aspect, and the angle are set in advance so as to obtain a desired image. The photographing condition data may be loaded by the RAM 76 in advance.

Further, in the photographing control unit 10, location information (e.g. 2521, Okita-town, Suwa-city, Nagano-prefecture) inputted from the GPS module 70 and time information (e.g. Aug. 28, 2008, 10:20) inputted from the RTC 52 are compared to photographing condition data stored in the ROM 77 so as to determine whether the location information and the time information satisfy conditions shown in the photographing condition data during the photographing of the camera module 73. In a case where the location information and the time information do not satisfy the conditions, a command is given to the camera module 73 through the Camera I/F 54 so as to allow the camera module 73 to end photographing an image.

Furthermore, in the photographing control unit 10, velocity information from the velocity detector 71 is acquired and a frame rate of the camera module 73 is controlled based on the velocity information. Concretely, the frame rate is set to be higher than a standard (30 [fps], for example) when the movable body travels at high speed, and the frame rate is set to be lower than the standard when the movable body travels at low speed.

In the photographing control unit 10, when a predicted result showing an occurrence of an accident is received from the accident predicting unit 11, a command is given to the camera module 73 through the Camera I/F 54 so as to allow the camera module 73 to start photographing an image. After a predetermined period of time passes, a command is given to the camera module 73 through the Camera I/F 54 so as to allow the camera module 73 to end the photographing of an image.

In the accident predicting unit 11, acceleration information inputted from the acceleration sensor 72 is compared to a threshold amount of acceleration stored in the ROM 77 so as to predict an occurrence of an accident and output the predicted result to the photographing control unit 10. Concretely, in a case of sudden decelerating (sudden breaking) or sudden accelerating (sudden starting), the accident predicting unit 11 predicts that an accident is to occur.

In the image recording unit 12, image data obtained by photographing by the camera module 73 is received through the camera I/F 54 in a frame unit in accordance with a notification of the start of the photographing (a type of image is also notified) from the photographing control unit 10, and the received image data is recorded in the recording medium 75 through the media I/F 56. At this time, location information corresponding to the image data is acquired from the photographing control unit 10 and the location information and the image data (hereinafter, this data is referred to as location corresponding image data) are recorded in a pair in the recording medium 75.

In the image recording unit 12, in accordance with a notification of the end of the photographing from the photographing control unit 10, starting time information and ending time information are received from the photographing control unit 10 and photographing content information is produced so as to be recorded in the recording medium 75. The photographing content information that is produced is obtained by combining an information number (serial number applied to each image data), information showing a type of image (information showing image type such as a local image and accident prediction image (also including identification information in a case of the local image)), photographing starting time (year, month, day, hour, minute), photographing ending time (year, month, day, and hour and time), and information of a storage address of location corresponding image data in the recording medium 75.

Here, the photographing content information serves as an index of the location corresponding image data.

Hereinafter, image data of which an image type is a local image is referred to as local image data, and image data of which an image type is an accident predicting image is referred to as accident predicting image data.

In the request data receiving unit 13, various request data that are received at the radio communication module 74 from the information processing device 200 are acquired through the communication I/F 55, and each of the request data that are acquired is outputted to a corresponding operation part.

Here, the request data include image acquisition request data, protection request data, and photographing condition update request data. The image acquisition request data requires an acquisition of image data that is recorded in the recording medium 75. The protection request data requires a protection with respect to image data that is recorded by the recording medium 75. The photographing condition update request data requires an update of the photographing condition data that is stored in the ROM 77.

In the request data receiving unit 13, the image acquisition request data is outputted to the image data transmitting unit 14, the protection request data is outputted to an access control unit 16, and the photographing condition update request data is outputted to a photographing condition data updating unit 17.

In the image data transmitting unit 14, image data that is specified by the image acquisition request data is acquired from the recording medium 75 through the media I/F 56 based on the image acquisition request data that is inputted from the request data receiving unit 13, and the image data that is acquired is transmitted to the information processing device 200 that is a source of the request through the communication I/F 55.

The transmitted data deleting unit 15 can be set whether the deleting unit 15 executes its function or not. In a case where the deleting unit 15 is set to execute its function, the deleting unit 15 deletes original data of the image data, which is transmitted by the image data transmitting unit 14, from the recording medium 75.

In the access control unit 16, access limitation is imposed with respect to the image data that is specified by the protection request data, based on the protection request data inputted from the request data receiving unit 13. Specifically, an operator and the like of the movable body are prevented from deleting the image data that is specified.

In the photographing condition data updating unit 17, the photographing condition data that is stored in the ROM 77 is updated based on the photographing condition updating request data that is inputted from the request data receiving unit 13. Specifically, the photographing condition data that is stored is deleted, or new photographing condition data is added.

Operations of the above operation units are achieved by executing various dedicated programs by the CPU 51, and include an operation that is achieved only by an arithmetic processing by the program execution and an operation that is achieved by controlling the hardware by the program execution.

A hardware configuration of the information processing device 200 will be described with reference to FIG. 4.

Figure 4:
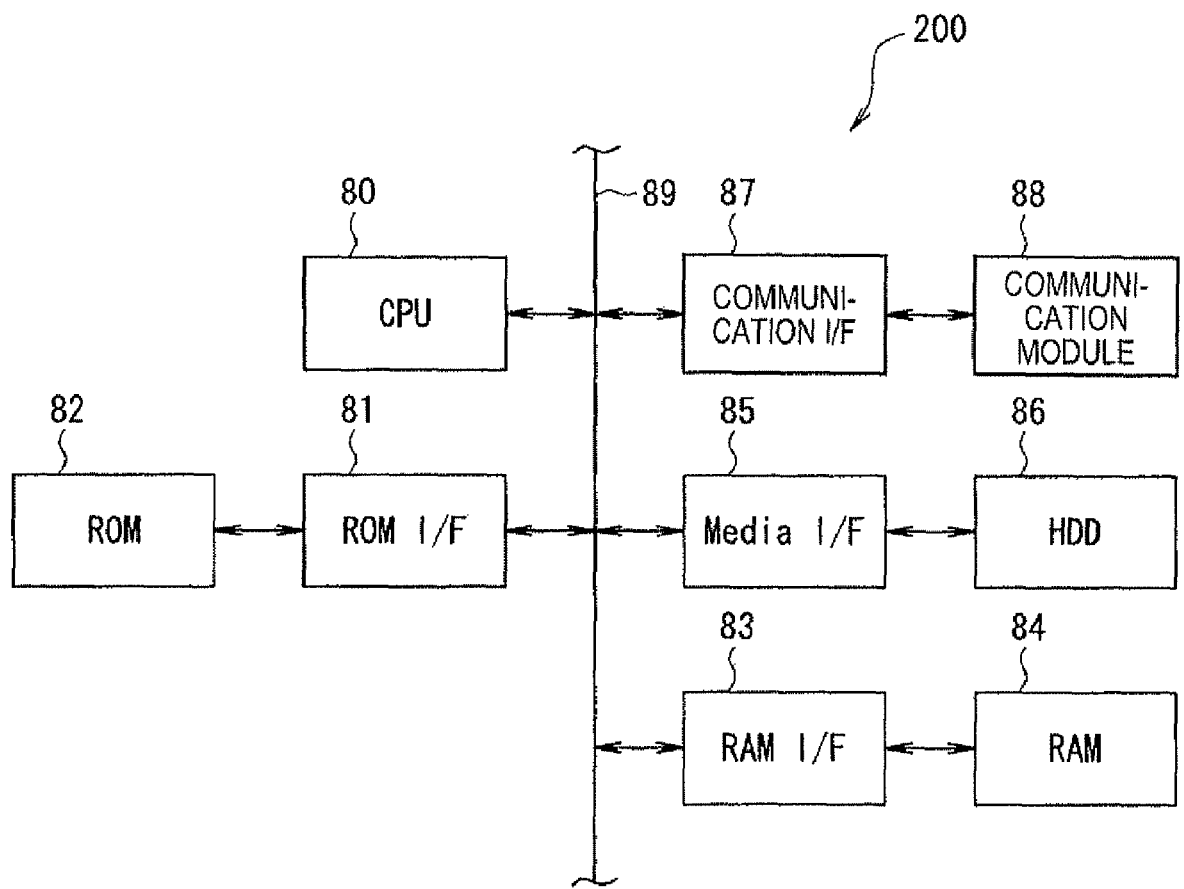
FIG. 4 is a block diagram showing a hardware configuration of an information processing device 200.

FIG. 4 is a block diagram showing the hardware configuration of the information processing device 200.

Referring to FIG. 4, the information processing device 200 includes: a CPU 80, a ROM I/F 81, a ROM 82, a RAM I/F 83, a RAM 84, a media I/F 85, a HDD 86, a communication I/F 87, and a communication module 88. The CPU 80 executes various programs. The ROM I/F 81 enables the CPU 80 and the ROM 82 to transmit and receive data to and from each other. The ROM 82 is a nonvolatile memory that stores various programs which are executed by the CPU 80 and data required for executing the programs. The RAM I/F 83 enables the CPU 80 and the RAM 84 to transmit and receive data to and from each other. The RAM 84 is a nonvolatile memory that stores the programs which are executed by the CPU 80 and data required for executing the programs. The media I/F 85 enables the CPU 80 and the HDD 86 to transmit and receive data to and from each other. The communication I/F 87 enables the CPU 80 and the communication module 88 to transmit and receive data to and from each other. The communication module 88 transmits and receives data to and from the image recording device 100 through the network 400 and the base station 300.

To the information processing device 200, a display device such as a CRT or LCD monitor, input equipments such as, an operation panel, a mouse, and a keyboard, and the like, though these are not shown, are coupled.

A functional configuration of the information processing device 200 will now be described with reference to FIGS. 5.

Figure 5:
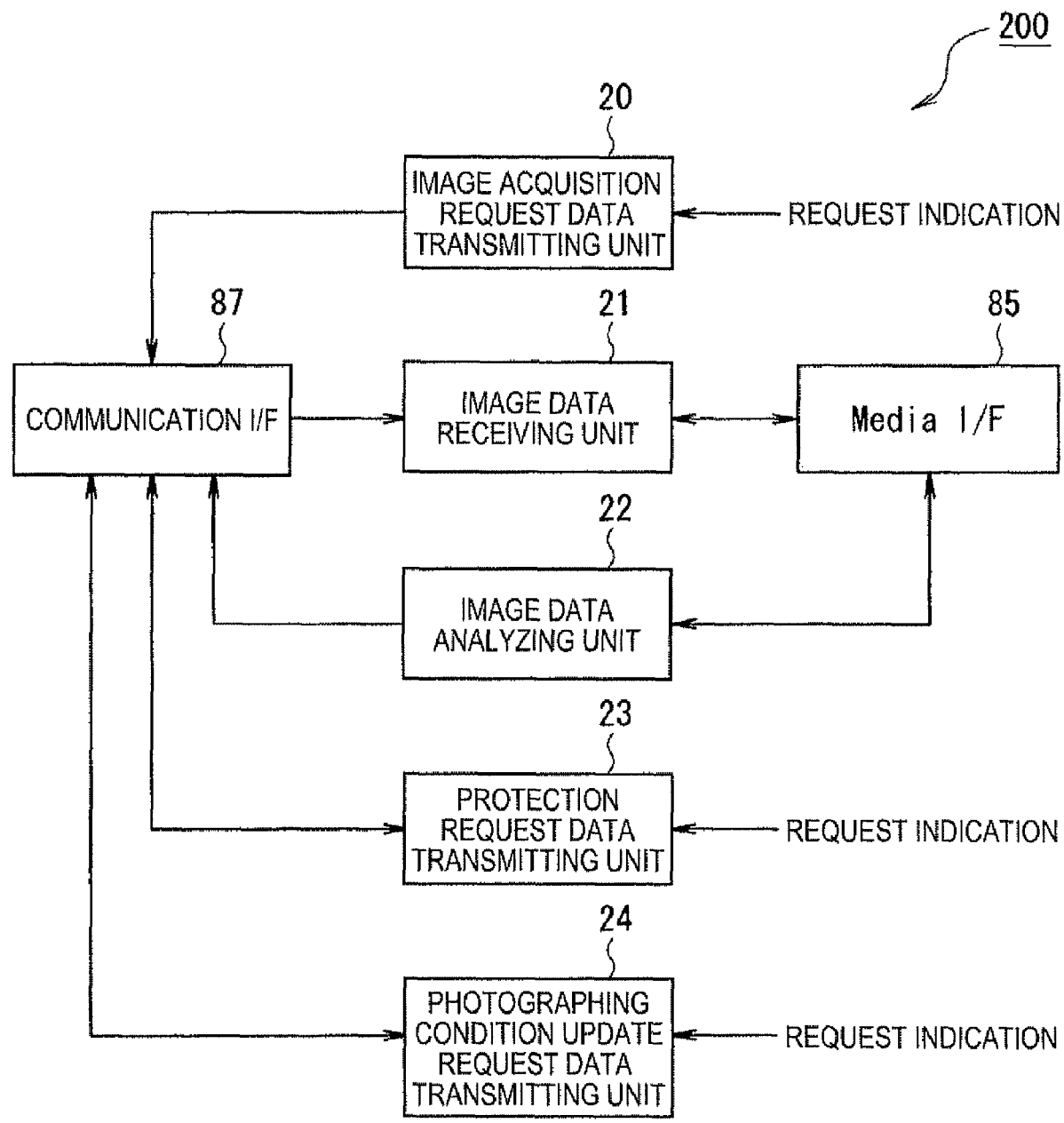
FIG. 5 is a block diagram showing a functional configuration of the information processing device 200.

FIG. 5 is a block diagram showing the functional configuration of the information processing device 200.

Referring to FIG. 5, as the functional configuration, the information processing device 200 includes: an image acquisition request data transmitting unit 20, an image data receiving unit 21, an image data analyzing unit 22, a protection request data transmitting unit 23, and a photographing condition update request data transmitting unit 24. Note that these units are not hardware units but functional units.

In the image acquisition request data transmitting unit 20, image acquisition request data is produced in response to image data acquisition request indication from a user through input equipment. The image acquisition request data is a request for acquiring image data having a photographing content which is specified by the acquisition request indication. Then the image acquisition request data that is produced is transmitted to the image recording device 100 through the communication I/F 87 and the communication module 88.

Concretely, image acquisition request data that includes an IP address of the image recording device 100 that is an acquisition object, an IP address of the information processing device 200, specified information of image data that is to be acquired (hereinafter, referred to as image specified information), and the like is produced so as to be transmitted. The image specified information includes information of an image type.

In the image data receiving unit 21, the image data that is received by the communication module 88 is acquired through the communication I/F 87, and the HDD 86 stores the image data that is acquired, through the media I/F 85.

In the image data analyzing unit 22, the image data that is stored in the HDD 86 is analyzed depending on an analysis indication from a user through input equipment and the HDD 86 stores the analysis result. For example, pattern matching with respect to an image that is searched is executed.

The image data analyzing unit 22 transmits the analysis result to other external device through the communication I/F 87 and the communication module 88 in response to a request from the external information processing device.

In the protection request data transmitting unit 23, protection request data is produced in response to a protection request indication with respect to specified image data from a user through the input equipment. The protection request data is a protection request for image data specified by protection request indication. Then the protection request data that is produced is transmitted to the image recording device 100 through the communication I/F 87 and the communication module 88.

Specifically, protection request data including an IP address of the image recording device 100 that is intended, an IP address of the information processing device 200, image indication information, and the like is produced so as to be transmitted.

In the photographing condition update request data transmitting unit 24, photographing condition update request data is produced in response to the update request indication made by a user through input equipment. The photographing condition update request data is a request for updating into an update content shown in update request indication of the photographing condition data. Then the photographing condition update request data that is produced is transmitted to the image recording device 100 through the communication I/F 87 and the communication module 88.

Concretely, photographing condition update request data that includes an IP address of the image recording device 100 that is intended, an IP address of the information processing device 200, and information of an update content (hereinafter, referred to as update content information) is produced so as to be transmitted.

Figure 6:
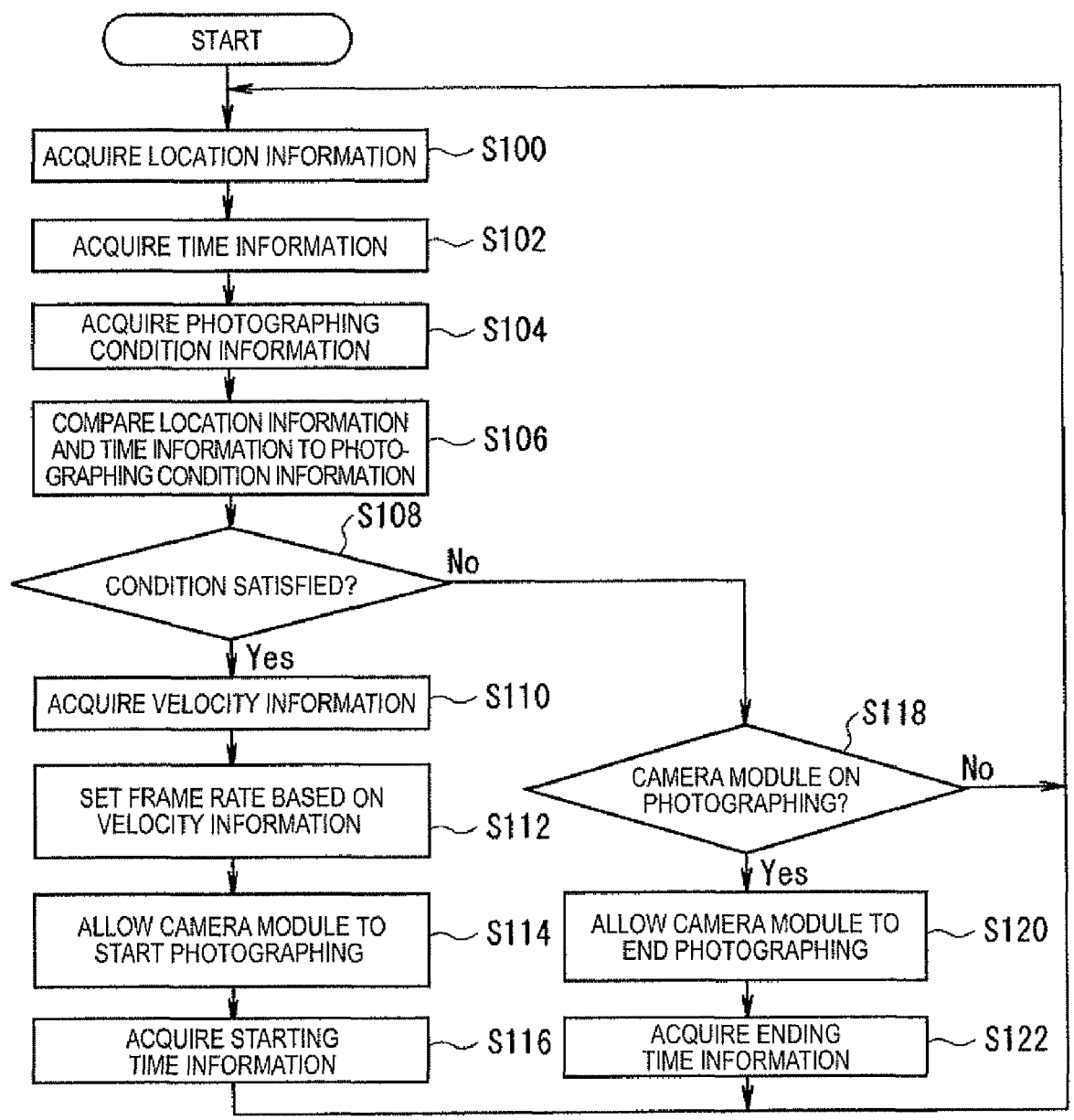
FIG. 6 is a flowchart showing a photographing control processing of a local image in a photographing control unit 10.

A flow of a control processing of local image photographing in the photographing control unit 10 of the image recording device 100 will be described with reference to FIG. 6. FIG. 6 is a flowchart showing the control processing of the local image photographing in the photographing control unit 10.

If the CPU 51 executes a dedicated program so as to start the control processing of local image photographing, the process goes to a step S100.

In the step S100, local information is acquired from the GPS module 70 in the photographing control unit 10. Then the process goes to a step S102.

In the step S102, time information is acquired from the RTC 52 in the photographing control unit 10. Then the process goes to a step S104.

In the step S104, photographing condition data is acquired from the ROM 77 through the ROM I/F 58 in the photographing control unit 10. Then the process goes to a step S106.

Here, in a case where the photographing condition data is read out by the RAM 76 in advance, the photographing condition data is acquired from the RAM 76 through the RAM I/F 57.

In the step S106, the location information that is acquired in the step S100 and the time information that is acquired in the step S102 are compared to local information and time information included in the photographing condition data, in the photographing control unit 10. Then the process goes to a step S108.

Here, comparison processing is executed with respect to all photographing condition data that are stored in the ROM 77. For example, in a case where there are five photographing condition data corresponding to five areas, the comparison processing is executed with respect to these five photographing condition data.

In the comparison processing, local information that is for specifying an area in which the photographing is executed and included in the photographing condition data is compared to the location information that is acquired, and time information that shows a period of time in which the photographing is executed and is included in the photographing condition data is compared to the time information that is acquired.

In the step S108, it is determined whether the location information and the time information acquired as above satisfy the condition shown in the photographing condition data or not based on the comparison result of the step S106, in the photographing control unit 10. In a case where the condition is satisfied (Yes), the process goes to a step S110, while in a case where the condition is not satisfied (No), the process goes to a step S118.

Here, it is determined that the condition is satisfied if the location information for specifying the area includes the same information as the location information that is acquired as above and the time information that is acquired as above is within the period of time in which the photographing is executed. While, if either one of the two information that are acquired does not agree the information in the photographing condition data, the condition is not satisfied.

In the step S110, velocity information of the movable body is acquired from the velocity detector 71, in the photographing control unit 10. Then the process goes to a step S112.

In the step S112, a frame rate in the photographing of the camera module 73 is determined based on the velocity information that is acquired in the step S110, and the camera module 73 is set to execute the photographing at the determined frame rate through the camera I/F 54, in the photographing control unit 10. Then the process goes to a step S114.

In the step S114, a photographing starting command is transmitted to the camera module 73 through the camera I/F 54 so as to allow the camera module 73 to start the photographing, in the photographing control unit 10. Then the process goes to a step S116.

In the step S116, time information of the starting time of the photographing is acquired from the RTC 52, in the photographing control unit 10. Then the process goes to the step S100.

On the other hand, in a case where the condition is not satisfied in the step S108 and the process goes to the step S118, it is determined whether the camel module 73 is in the photographing or not in the photographing control unit 10. In a case where it is determined that the camera module 73 is in the photographing (Yes), the process goes to a step S120, while in a case where it is determined that the camera module 73 is not in the photographing (No), the process goes to the step S100.

In the case where the step goes to the step S120, a photographing ending command is transmitted to the camera module 73 through the camera I/F 54 so as to allow the camera module 73 to end the photographing, in the photographing control unit 10. Then the process goes to a step S122.

In the step S122, time information of the ending time of the photographing is acquired from the RTC 52, in the photographing control unit 10. Then the process goes to the step S100.

Figure 7:
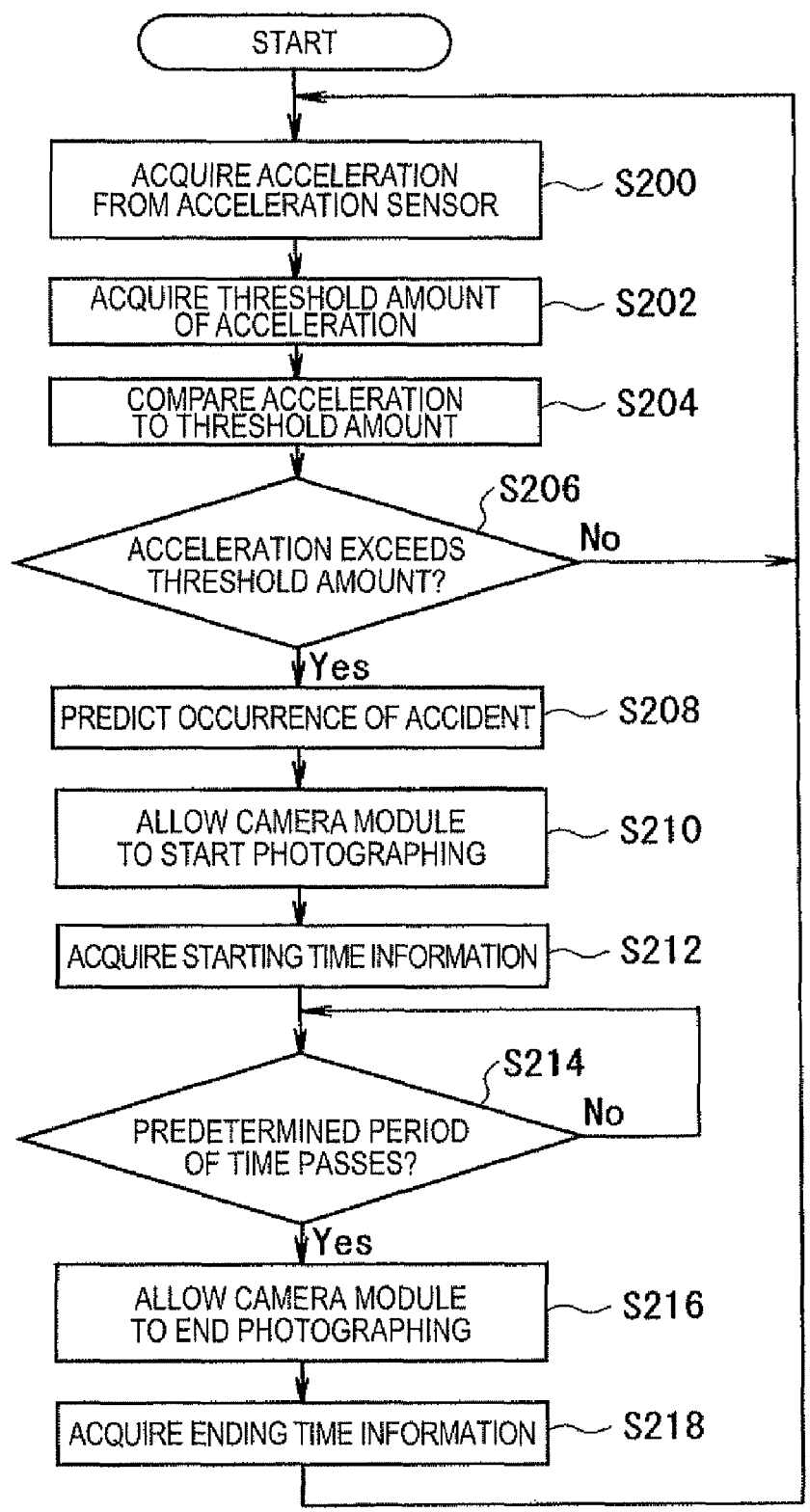
FIG. 7 is a flowchart showing a prediction processing at an accident predicting unit 11 and a photographing control processing of an accident prediction image at the photographing control unit 10.

A flow of a prediction processing of the accident predicting unit 11 and a photographing control processing for an accident prediction image in the photographing control unit 10 of the image recording device 100 will be described with reference to FIG. 7. FIG. 7 is a flowchart showing the prediction processing in the accident predicting unit 11 and the photographing control processing of the accident prediction image in the photographing control unit 10.

If the CPU 51 executes a dedicated program so as to start the photographing control processing, the process goes to a step S200.

In the step S200, acceleration of the movable body is acquired from the acceleration sensor 72, in the accident predicting unit 11. Then the process goes to a step S202.

In the step S202, a threshold amount of the acceleration that is stored in the ROM 77 is acquired through the ROM I/F 58, in the accident predicting unit 11. Then the process goes to a step S204.

In the step S204, the acceleration that is acquired in the step S200 is compared to the threshold amount that is acquired in the step S202, in the accident predicting unit 11. Then the process goes to a step S206.

In the step S206, it is determined whether the acceleration exceeds the threshold amount or not based on the comparison result obtained in the step S204, in the accident predicting unit 11. In a case where it is determined that the acceleration exceeds the threshold amount (Yes), the process goes to a step S208, while in a case where it is determined that the acceleration does not exceed the threshold amount (No), the process goes to the step S200.

In the step S208, it is predicted that an accident occurs from the determination result obtained in the step S206 and the determination result is outputted to the photographing control unit 10, in the accident predicting unit 11. Then the process goes to a step S210.

In a case where the process moves to the step S210, a photographing starting command transmitted to the camera module 73 through the camera I/P 54 in response to the predicted result that an accident occurs, so as to allow the camera module 73 to start photographing an image, in the photographing control unit 10. Then the process goes to a step S212.

In the step S212, time information of the photographing starting time is acquired from the RTC 52, in the photographing control unit 10. Then the process goes to a step S214.

In the step S214, it is determined whether a predetermined period of time passes from the photographing start or not, in the photographing control unit 10. In a case where it is determined that the predetermined period of time passes (Yes), the process goes to a step S216, while in a case where it is determined that the predetermined period of time does not pass (No), the determination processing is repeated until the predetermined period of time passes.

In a case where the process moved to the step S216, a photographing ending command is transmitted to the camera module 73 through the camera I/F 54 so as to allow the camera module 73 to end the photographing, in the photographing control unit 10. Then the process goes to a step S218.

In the step S218, time information of the ending time of the photographing is acquired from the RTC 52, in the photographing control unit 10. Then the process goes to the step S200.

Figure 8:
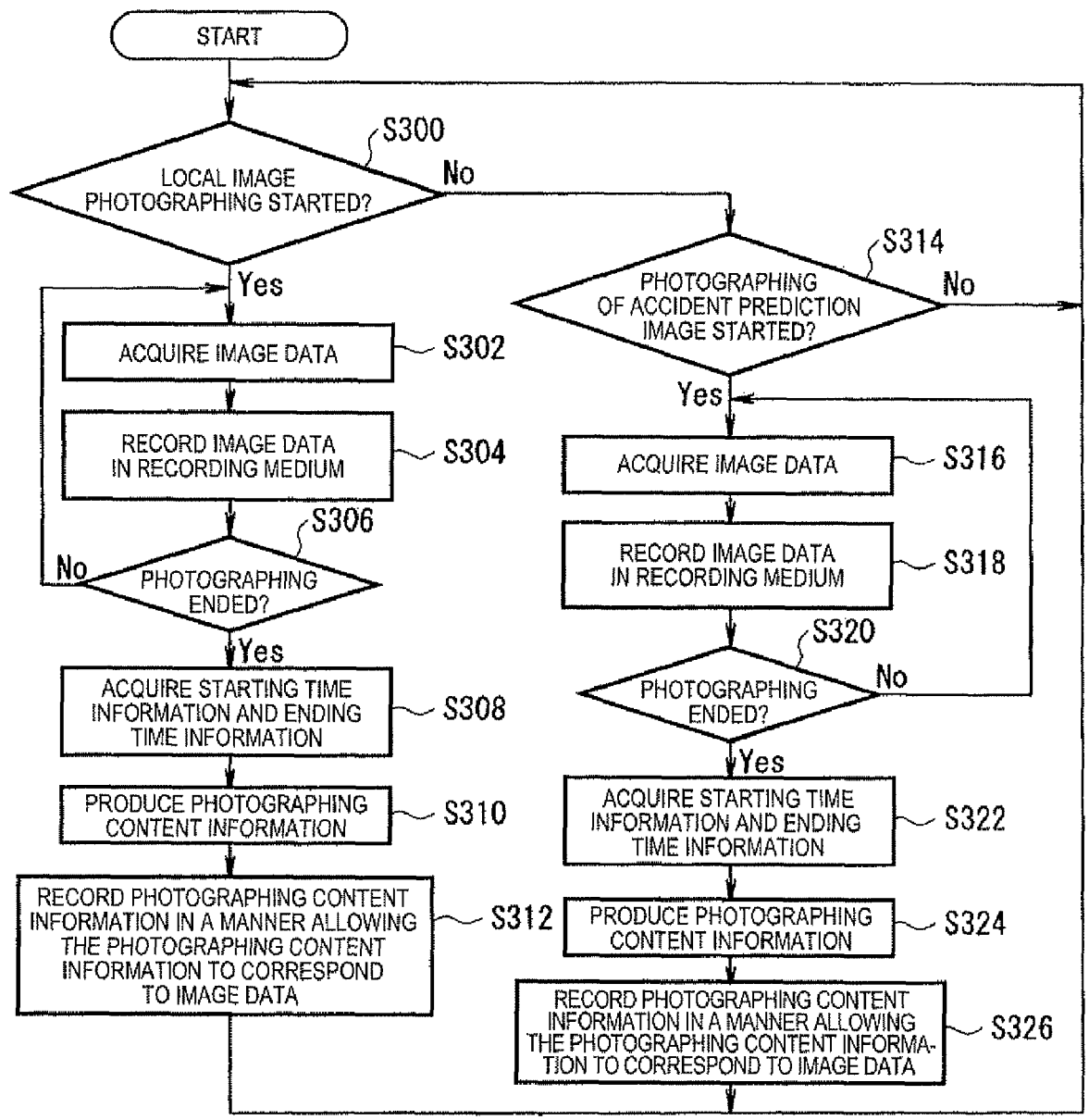
FIG. 8 is a flowchart showing an image recording processing in an image recording unit 12.

A flow of an image recording processing in the image recording unit 12 of the image recording device 100 will be described with reference to FIG. 8. FIG. 8 is a flowchart showing the image recording processing in the image recording unit 12.

If the CPU 51 executes a dedicated program so as to start the image recording processing, the process goes to a step S300.

In the step S300, it is determined whether the local image photographing is started or not based on presence or absence of a photographing starting notification from the photographing control unit 10, in the image recording unit 12. In a case where it is determined that the photographing is started (Yes), the process goes to a step S302, while in a case where it is determined that the photographing is not started (No), the process goes to a step S314.

In a case where the process goes to the step S302, image data that is acquired by the photographing by the camera module 73 is acquired in a frame unit through the camera I/F 54, in the image recording unit 12. Then the process goes to a step S304.

In the step S304, time-series location information is acquired from the photographing control unit 10 and the location information is recorded in the recording medium 75 through the media I/F 56 in a manner allowing the location information to correspond to the image data obtained by the photographing, in the image recording unit 12. Then the process goes to a step S306.

In the step S306, it is determined whether the photographing is ended or not based on presence or absence of a photographing ending notification from the photographing control unit 10, in the image recording unit 12. In a case where it is determined that the photographing is ended (Yes), the process goes to a step S308, while in a case where it is determined that the photographing is not ended (No), the process goes to the step S302.

In a case where the process goes to the step S308, information showing an image type (here, information that shows a local image and is for specifying an area), photographing starting time information, and photographing ending time information are acquired from the photographing control unit 10, in the image recording unit 12. Then the process goes to a step S310.

In the step S310, an information number and storage address information of image data are added to the information that is acquired in the step S308 so as to produce photographing content information, in the image recording unit 12. Then the process goes to a step S312.

In the step S312, the photographing content information that is produced in the step S310 is recorded in the recording medium 75 through the media I/F 56, in the image recording unit 12. Then the process goes to the step S300.

On the other hand, in a case where the local image photographing is not started in the step S300 and the process goes to the step S314, it is determined whether an accident prediction image photographing is started or not based on presence or absence of a photographing starting notification of an accident prediction image from the photographing control unit 10, in the image recording unit 12. In a case where it is determined that the accident prediction image photographing is started (Yes), the process goes to a step S316, while in a case where it is determined that the photographing is not started (No), the process goes to the step S300.

In a case where the process goes to the step S316, image data that is acquired by photographing by the camera module 73 is acquired in a frame unit through the camera I/F 54, in the image recording unit 12. Then the process goes to a step S318.

In the step S318, time-series location information is acquired from the photographing control unit 10 and the location information is recorded in the recording medium 75 through the media I/F 56 in a manner allowing the location information to correspond to the image data, in the image recording unit 12. Then the process goes to a step S320.

In the step S320, it is determined whether the photographing is ended or not based on presence or absence of a photographing ending notification from the photographing control unit 10, in the image recording unit 12. In a case where it is determined that the photographing is ended (Yes), the process goes to a step S322, while in a case where it is determined that the photographing is not ended (No), the process goes to the step S316.

In a case where the process goes to the step S322, information showing an image type (here, information that shows an accident prediction image), photographing starting time information, and photographing ending time information are acquired from the photographing control unit 10, in the image recording unit 12. Then the process goes to a step S324.

In the step S324, an information number and storage address information of image data are added to the information that is acquired in the step S322 so as to produce photographing content information, in the image recording unit 12. Then the process goes to a step S326.

In the step S326, the photographing content information that is produced in the step S324 is recorded in the recording medium 75 through the media I/F 56, in the image recording unit 12. Then the process goes to the step S300.

Figure 9:
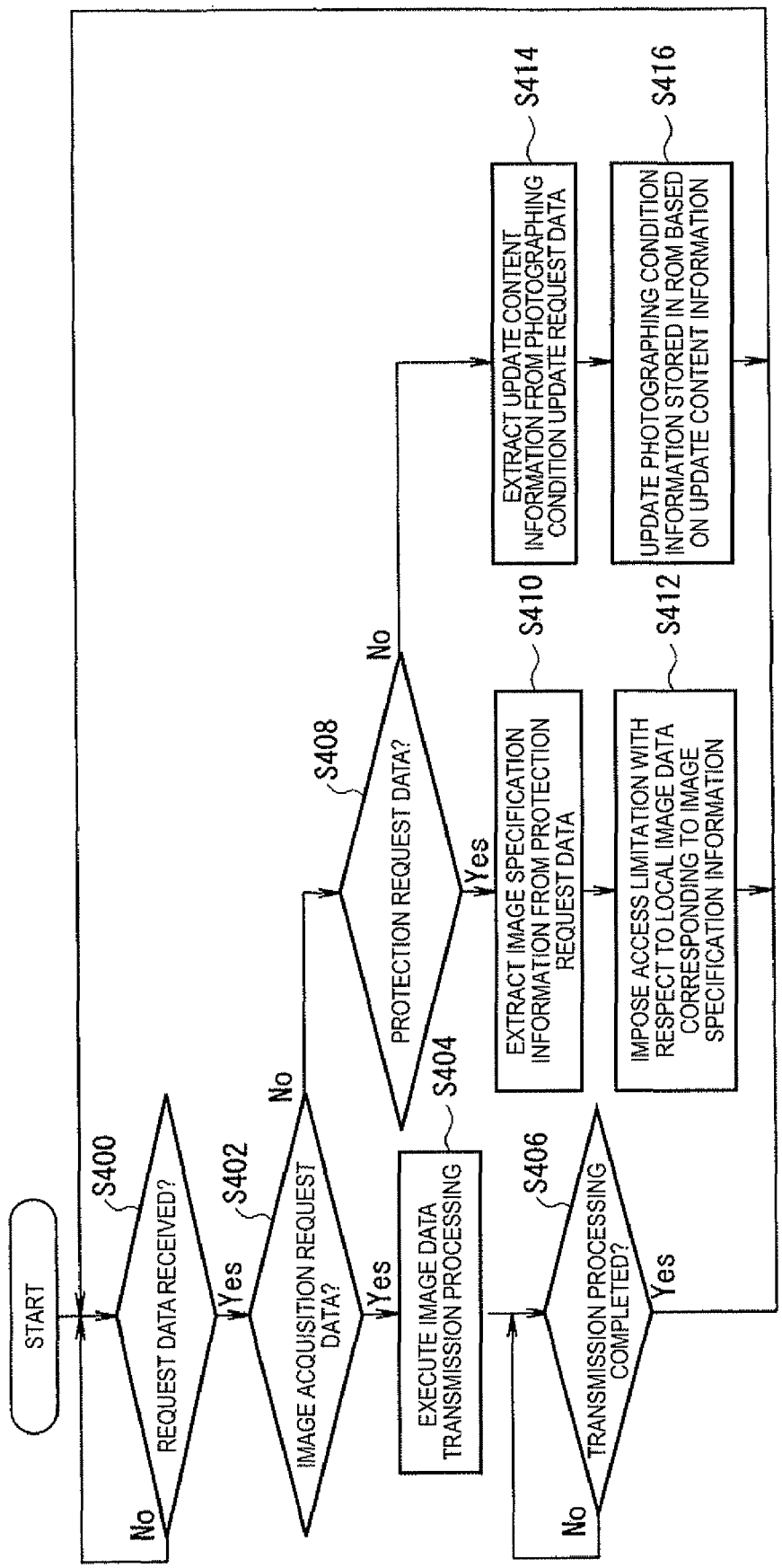
FIG. 9 is a flowchart showing a request corresponding operation processing in the image recording unit 12.

A flow of an operation processing responding to various request data in the image recording device 100 will be described with reference to FIG. 9. FIG. 9 is a flowchart showing a request response operation processing in the image recording unit 12.

If the CPU 51 executes a dedicated program so as to start the request response operation processing, the process goes to a step S400.

In the step S400, it is determined whether request data is received or not based on data that is received by the radio communication module 74, in the request data receiving unit 13. In a case where it is determined that the request data is received (Yes), the process goes to a step S402, while in a case where it is determined that the request data is not received (No), the determination is repeated until the request data is received.

In a case where the process goes to the step S402, it is determined whether the request data that is received is image acquisition request data or not, in the request data receiving unit 13. In a case where the request data is the image acquisition request data (Yes), the image acquisition request data is outputted to the image data transmitting unit 14 and the process goes to a step S404. While, in a case where the request data is not the image acquisition request data, the process goes to a step S408.

In a case where the process goes to the step S404, an image data transmission processing is executed based on the image acquisition request data, in the image data transmitting unit 14. Then the process goes to a step S406.

In the step S406, it is determined whether the image data transmission processing is completed or not based on presence or absence of a notification from the image data transmitting unit 14, in the request data receiving unit 13. In a case where it is determined that the transmission processing is completed (Yes), the process goes to the step S400, while in a case where it is determined that the processing is not completed (No), a standby state remains until the image data transmission processing is completed.

On the other hand, in a case where the request data that is received is not the image acquisition request data in the step S402 and the process goes to the step S408, it is determined whether the request data that is received is protection request data or not, in the request data receiving unit 13. In a case where the request data is the protection request data (Yes), the protection request data is outputted to the access control unit 16 and the process goes to the step S410. While, in a case where the request data is not the protection request data (No), photographing condition update request data is outputted to the photographing condition data updating unit 17 and the process goes to a step S414.

In a case where the process goes to the step S410, image specification information is extracted from the protection request data, in the access control unit 16. Then the process goes to a step S412.

In the step S412, an access limitation is imposed on image data specified from the image specification information that is extracted in the step S410, in the access control unit 16. Then the process goes to the step S400.

In a case where the request data that is received is not the protection request data in the step S408 and the process goes to the step S414, update content information is extracted from the photographing condition update request data, in the photographing condition data updating unit 17. Then the process goes to a step S416.

In the step S416, the photographing condition data that is stored in the ROM 77 is updated based on the update content information that is extracted in the step S414, in the photographing condition data updating unit 17. Then the process goes to the step S400.

Figure 10:
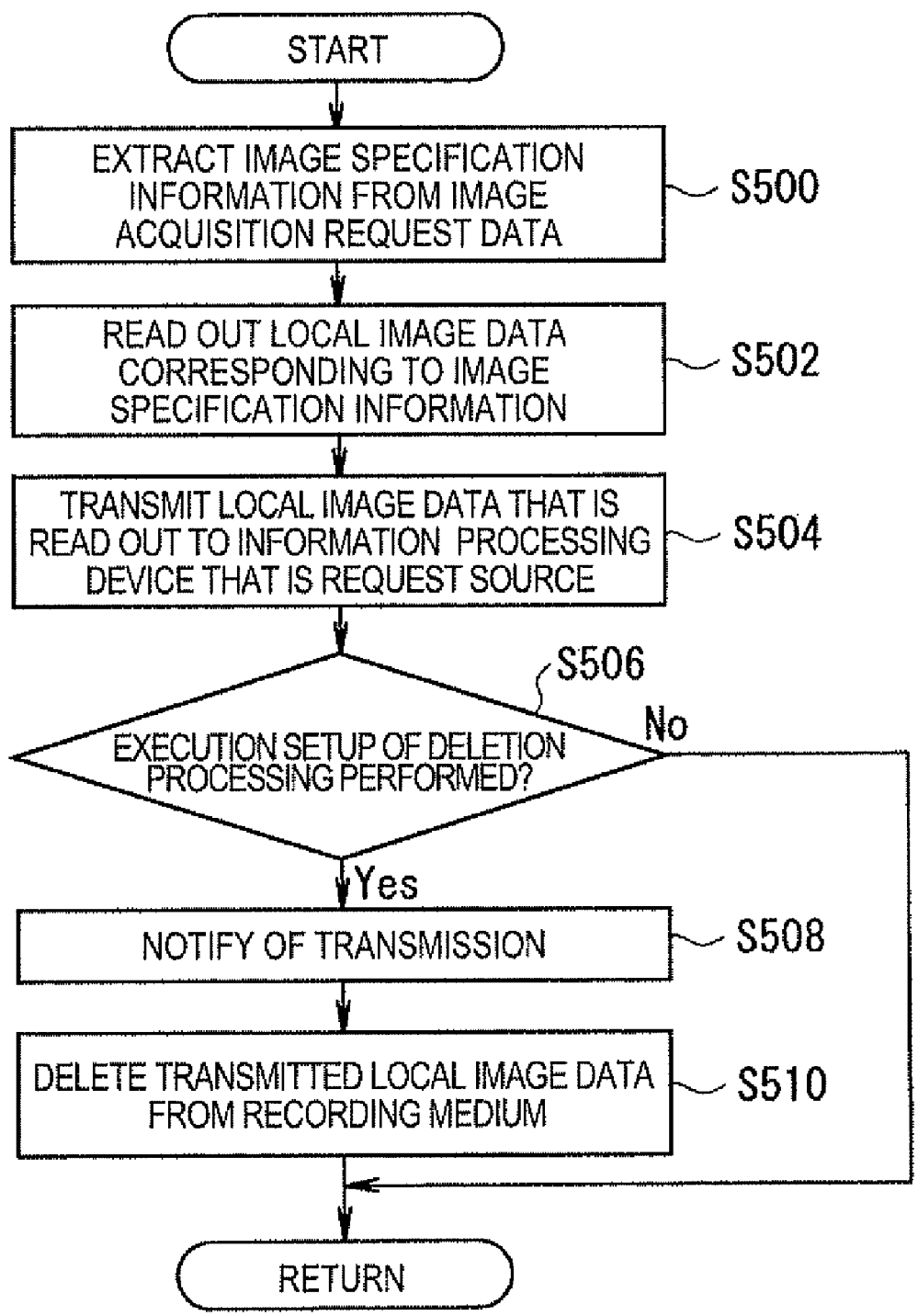
FIG. 10 is a flowchart showing an image data transmit processing of an image data transmitting unit 14.

A flow of the image data transmission processing executed in the step S404 will be described with reference to FIG. 10. FIG. 10 is a flowchart showing the image data transmission processing of the image data transmitting unit 14.

If the image data transmission processing is executed in the step S404, the process goes to a step S500 in which the image specification information is extracted from the image acquisition request data in the image data transmitting unit 14. Then the process goes to a step S502.

In the step S502, image data specified by the image specification information that is extracted in the step S500 is read out from the image data recorded in the recording medium 75, in the image data transmitting unit 14. Then the process goes to a step S504.

In the step S504, the image data that is read out in the step S502 is transmitted to the information processing device 200 that is a source of the image acquisition request data through the communication I/F 55 and the radio communication module 74, in the image data transmitting unit 14. Then the process goes to a step S506.

In the step S506, it is determined whether an execution setup of a deletion processing of the transmitted data is performed or not, in the image data transmitting unit 14. In a case where it is determined that the execution setup is performed (Yes), the process goes to a step S508, while in a case where it is determined that the execution setup is not performed (No), a series of processing is ended and the process goes back to an original processing.

In a case where the process goes to the step S508, the transmitted data deleting unit 15 is notified that the image data is transmitted, in the image data transmitting unit 14. Then the process goes to a step S510.

In the step S510, original data of the image data that is transmitted in the step S504 is deleted from the recording medium 75 in the transmitted data deleting unit 15, and a series of these steps is ended and the process returns to the former processing.

Figure 11:
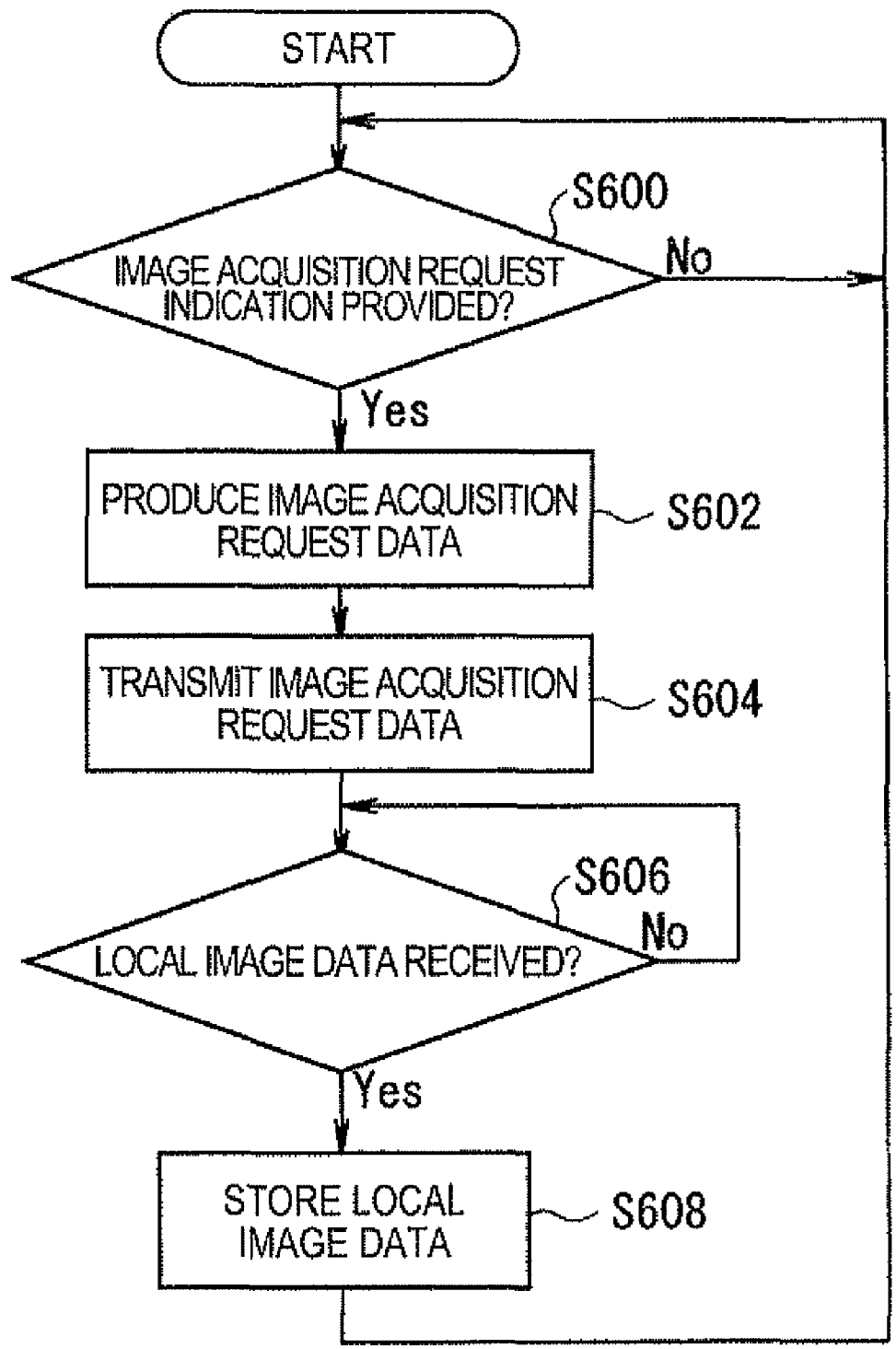
FIG. 11 is a flowchart showing an image data acquisition processing of the information processing device 200.

A flow of an image data acquisition processing of the information processing device 200 will be described with reference to FIG. 11. FIG. 11 is a flowchart showing the image data acquisition processing of the information processing device 200.

If the CPU 80 executes a dedicated program so as to start the image data acquisition processing, the process goes to a step S600.

In the step S600, it is determined whether an image acquisition request indication from a user through input equipment is provided or not, in the image acquisition request data transmitting unit 20. In a case where it is determined that the indication is provided (Yes), the process goes to a step S602, while in a case where it is determined that the indication is not provided (No), the determination processing is repeated.

In a case where the process goes to the step S602, image acquisition request data including an IP address of the information processing device 200, an IP address of the image recording device 100 that is an acquisition object, and image specification information is produced, in the image acquisition request data transmitting unit 20. Then the process goes to a step S604.

In the step S604, the image acquisition request data that is produced in the step S602 is transmitted to the image recording device 100 that is the acquisition object through the communication I/F 87 and the communication module 88, in the image acquisition request data transmitting unit 20. Then the process goes to a step S606.

In the step S606, it is determined whether the image data corresponding to the image acquisition request data that is transmitted in the step S604 is received or not based on reception data of the communication module 88, in the image data receiving unit 21. In a case where it is determined that the image data is received (Yes), the process goes to a step S608, while in a case where it is determined that the image data is not received (No), the determination is repeated until the image data is received.

In a case where the process goes to the step S608, the image data that is received is stored in the HDD 86 through the media IF 85, in the image data receiving unit 21. Then the process goes to the step S600.

Figure 12:
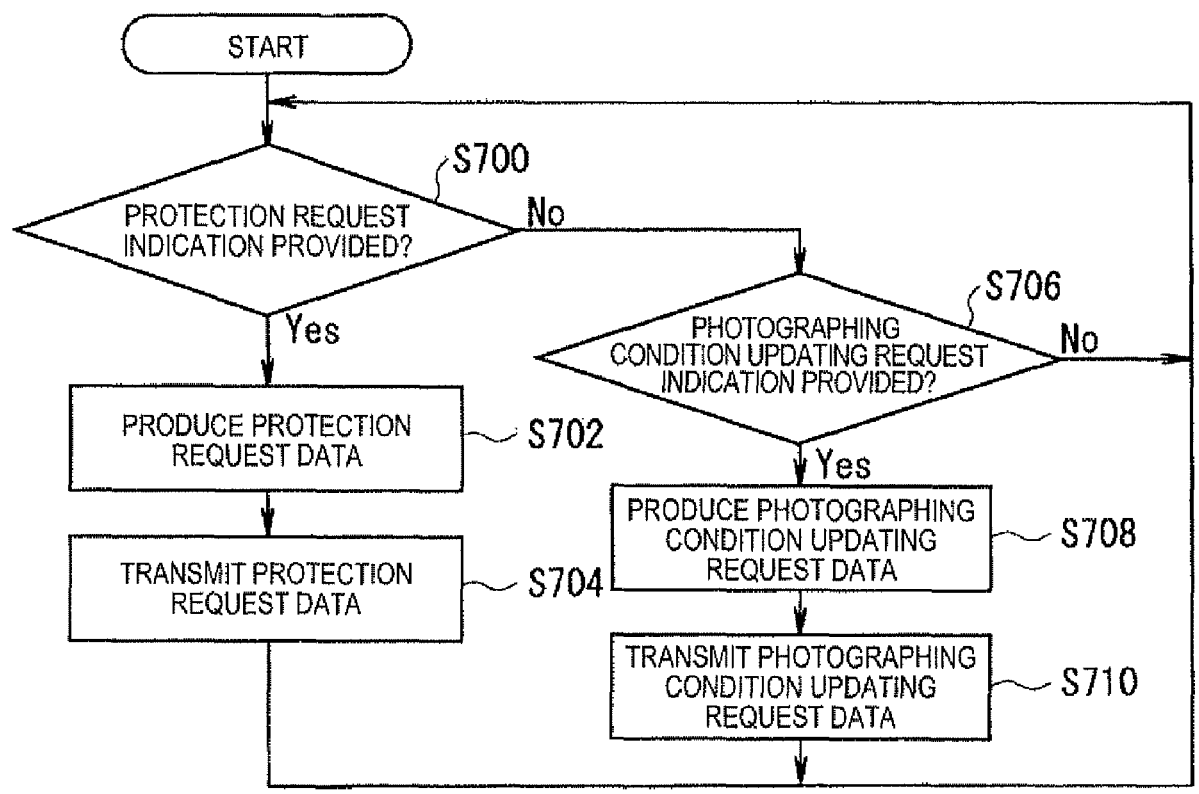
FIG. 12 is a flowchart showing a protection request transmission processing and a photographing condition update requesting data transmit processing at the information processing device 200.

A flow of a protection request transmission processing and a photographing condition updating request data transmission processing in the information processing device 200 will be described with reference to FIG. 12. FIG. 12 is a flowchart showing the protection request transmission processing and the photographing condition updating request data transmission processing in the information processing device 200.

If the CPU 80 executes a dedicated program so as to start the protection request transmission processing and the photographing condition updating request transmission processing, the process goes to a step S700.

In the step S700, it is determined whether a protection request indication from a user through input equipment is provided or not, in the protection request data transmitting unit 23. In a case where it is determined that the indication is provided (Yes), the process goes to a step S702, while in a case where it is determined that the indication is not provided (No), the process goes to a step S706.

In a case where the process goes to the step S702, protection request data including an IP address of the information processing device 200, an IP address of the image recording device 100 that is an acquisition object, and image specification information is produced based on the protection request indication, in the protection request data transmitting unit 23. Then the process goes to a step S704.

In the step S704, the protection request data that is produced in the step S702 is transmitted to the image recording device 100 that is intended, through the communication I/F 87 and the communication module 88, in the protection request data transmitting unit 23. Then the process goes to the step S700.

On the other hand, in a case where the protection request indication is not provided in the step S700 and the process goes to the step S706, it is determined whether photographing condition updating request indication is provided or not, in the protection request data transmitting unit 23. In a case where it is determined that the indication is provided (Yes), the process goes to a step S708, while it is determined that the indication is not provided (No), the process goes to the step S700.

In a case where the process goes to the step S708, photographing condition updating request data including an IP address of the information processing device 200, an IP address of the image recording device 100 that is an acquisition object, and update content information is produced, in the photographing condition updating request data transmitting unit 24. Then the process goes to a step S710.

In the step S710, the photographing condition updating request data that is produced in the step S708 is transmitted to the image recording device 100 that is intended through the communication I/F 87 and the communication module 88, in the photographing condition updating request data transmitting unit 24. Then the process goes to the step S700.

An actual operation using the image managing system 1 of the present embodiment for watching service for a specific area will be described with reference to FIGS. 13A and 13B. FIG. 13A is a diagram illustrating photographing condition data, and FIG. 13B is a diagram illustrating a recording content of local image data.

Here, the image recording device 100 of the embodiment is installed on vehicles such as a patrol car, a taxi, a bus (including a pickup bus of a kindergarten), and a vehicle for door-to-door delivery (a vehicle for delivering a pizza door-to-door, for example) that frequently travel within a specific area.

Further, the information processing device 200 is under the control of police or a security company. Police or the security company uses the information processing device 200 to acquire image data of the specific area that is recorded in the image recording device 100 which is installed on each vehicle, thus monitoring an occurrence of crime in the specific area.

In areas in which intended vehicles frequently travel, areas in which crimes such as arson, abduction, purse snatch, and sneak thief frequently occur are set in the photographing condition data as areas of which photographing is executed, based on past crime occurrence records, for example. Specifically, acting areas of people who are seemed to encounter crimes are set as the areas (carriage way near a school zone, a route to and from school or work) in which the photographing is executed.

A period of time in which crimes as above frequently occur, for example, is set to be as a photographing period of time. Unique ID numbers are set to correspond to respective areas and periods of time in which the photographing is executed and are stored in the ROM 77 as photographing condition data.

Specifically, the photographing condition data has a data structure that is a combination of monitoring ID numbers (unique numbers), location information that shows monitoring (photographing) areas (hereinafter, referred to as monitoring areas), and monitoring time information, as shown in FIG. 13A.

Here, it is preferable that police or the security company properly explain and determine monitoring areas in dialogue with local residents, because unilateral determination by police or the security company may cause friction with the local residents.

An operator of police or the security company inputs photographing condition updating request indication through input equipment so as to allow the image recording device 100 that is installed in each vehicle to store the photographing condition data having the above structure. For example, on a dedicated setting screen that is shown on a window by executing a dedicated program, the operator sets update condition information (location information showing monitoring areas (hereinafter, referred to as monitoring area information) and monitoring time information) with input equipment such as a mouse and a key board, and presses an update indication button that is provided on the screen by GUI so as to input the indication. In the embodiment, a dedicated program automatically provides the monitoring ID numbers and selects a vehicle that is an update object (the image recording device 100).

If the photographing condition updating request indication is inputted (branch of "Yes" in the step S706), the information processing device 200 provides monitoring ID numbers to the monitoring area information and the monitoring time information that are set, thus producing update content information. Further, the information processing device 200 provides the update content information that is produced with an updating request command, and information of an IP address of the information processing device 200 and a destination IP address of the image recording device 100 that is an update object so as to produce photographing condition updating request data (step S708). Then the device 200 transmits the photographing condition updating request data that is produced to the image recording device 100 that is the update object (step S710).

On the other hand, if the image recording device 100 receives the photographing condition updating request data from the information processing device 200 (branch of "No" in the step S408), the device 100 extracts update content information from the photographing condition updating request data that is received (step S414) and updates the photographing condition data that is stored in the ROM 77 based on the update content information that is extracted (step S416).

If the photographing condition data is set as above and each vehicle starts traveling within the specific area, the image recording device 100 compares location information that is acquired by the GPS module 70 and time information that is acquired by the RTC 52 to the photographing condition data that is stored in the ROM 77 (step S100 to step S106). From a result of this comparison, the image recording device 100 determines that the conditions are satisfied when the traveling position of the vehicle agrees with any of location information that is included in the monitoring area information and the traveling time is within the period of time of the monitoring time information. In a case where the conditions are satisfied, the image recording device 100 acquires velocity information from the velocity detector 71 (step S110) and sets a frame rate of the camera module 73 so as to allow the rate to correspond to the velocity information. Then the device 100 provides the camera module 73 with a photographing starting command so as to allow the camera module 73 to start photographing (step S114). Accordingly, the camera module 73 starts photographing an image in a predetermined photographing direction and a predetermined photographing range. At this time, the device 100 acquires photographing starting time information (step S116).

If the photographing in the monitoring areas is started (branch of "Yes" in the step S300), the device 100 sequentially acquires image data from the camera module 73 in a frame unit (step S302), and provides information of a location in which the photographing is executed to the image data that is acquired so as to store the image data in the recording medium 75 (step S304). Specifically, as shown in FIG. 13B, location corresponding image data 752 obtained by providing location information that changes every second depending on the travel of the vehicle (location information time-series data) to the image data is stored.

Even though the camera module 73 starts photographing, the image recording device 100 repeatedly executes the processing of the steps S100 to S108 at a constant frequency. If the vehicle goes out of the monitoring area or the current time is out of the monitoring period of time (branch of "No" in the step S108) and thus the conditions are not satisfied, the device 100 provides the camera module 73 that is in the photographing with a photographing ending command so as to allow the camera module 73 to end photographing (step S118 and step S120). At this time, the device 100 acquires photographing ending time information (step S122).

After the photographing is ended (branch of "Yes" in the step S306), the device 100 gives unique information numbers to the photographing starting time information and the photographing ending time information (here, information of year, month, day, and time) that are acquired, information showing an image types and information of an address in which the image data is recorded so as to produce photographing content information. Then the device 100 stores the photographing content information that is produced in the recording medium 75. Specifically, as shown in FIG. 13B, information 750 that is a set including a information number, a monitoring ID number, photographing starting date and time, photographing ending date and time, and an address showing an area in which the location corresponding image data 752 is present is recorded.

In order to fulfill the same function as that of known drive recorder, the image recording device 100 periodically compares acceleration received from the acceleration sensor 72 to a threshold amount with respect to acceleration that is stored in the ROM 77 so as to determine whether sudden accelerating or sudden decelerating occurs from the result of this comparison (step S200 to step S206). In a case where the device 100 determines that the sudden accelerating or the sudden decelerating occurs (branch of "Yes" in the step S206), the device 100 predicts an occurrence of an accident (step S208) and allows the camera module 73 to start photographing (step S210). At this time, the device 100 acquires photographing starting time information (step S212).

If the camera module 73 starts to photograph an accident prediction image (branch of "Yes" in the step S314), the device 100 sequentially acquires image data from the camera module 73 in a frame unit (step S316), and provides information of a location in which the photographing is executed to the image data that is acquired so as to store the image data in the recording medium 75 (step S318).

The processing of photographing and recording an accident prediction image is a temporary processing, and if predetermined photographing time passes (branch of "Yes" in the step S214), the camera module 73 is allowed to end the photographing (step S216). At this time, the device 100 acquires photographing ending time information (step S218).

If the photographing is ended (branch of "Yes" in the step S320), the device 100 gives unique information numbers to the photographing starting time information and the photographing ending time information that are acquired, and information of an address in which the image data is recorded so as to produce photographing content information. Then the device 100 records the photographing content information that is produced in the recording medium 75. Specifically, information excluding the monitoring ID number from photographing content information 750 shown in FIG. 13B is recorded in the accident predicting image data.

If the image data of the monitoring area is recorded in the image recording device 100 which is installed on each vehicle as above, an administrator of the information processing device 200 first executes a protection request with respect to the record data (photographing content information and location corresponding image data) so as to prevent the image data that is recorded from being deleted arbitrarily.

Specifically, police or an operator of a security company inputs a protection request indication to the information processing device 200 through input equipment. For example, as is the case with the photographing condition updating request indication, the operator sets information of image data of the protection object (image indication information) on a dedicated setting screen and presses a protection indication button that is provided on the screen by GUI or the like so as to input the indication.

If the protection request indication is inputted (branch of "Yes" in the step S700), the information processing device 200 provides a protection request command, the IP address of the information processing device 200, and the destination IP address of the image recording device 100 that is intended to the image indication information that is set, so as to produce protection request data (step S702). Then the device 200 transmits the protection request data that is produced to the image recording device 100 that is intended (step S704).

On the other hand, if the image recording device 100 receives the protection request data from the information processing device 200 (branch of "Yes" in the step S408), the device 100 extracts image indication information from the protection request data that is received (step S410) and executes an access control with respect to the record data, which is specified by the image indication information that is extracted, among the record data recorded in the recording medium 75 (step S412). Concretely, the device 100 prohibits overwriting on data in the embodiment.

Next, police or the operator of the security company inputs the image acquisition request indication to the information processing device 200 through input equipment so as to acquire the local image data that is recorded in the image recording device 100 installed on each vehicle. For example, as is the cases with the photographing condition updating request indication and the protection request indication, the operator sets image indication information on a dedicated setting screen and presses an image acquisition indication button that is provided on the screen by GUI or the like so as to input the indication.

If the image acquisition request indication is inputted (branch of "Yes" in the step S600), the information processing device 200 provides an image acquisition request command, the IP address of the information processing device 200, and the destination IP address of the image recording device 100 that is intended to the image indication information that is set, so as to produce image acquisition request data (step S602). Then the device 200 transmits the image acquisition request data that is produced to the image recording device 100 that is intended (step S604).

If the image recording device 100 receives the image acquisition request data from the information processing device 200 (branch of "Yes" in the step S402), the device 100 executes the image data transmission processing (step S404).

If the image data transmission processing is executed, the device 100 extracts image indication information from the image acquisition request data that is received (step S500), and reads out the record data specified by the image indication information that is extracted (step S502).

Concretely, the image indication information includes monitoring ID information that the information processing device 200 has had in advance. The device 100 detects the record data recorded in the recording medium 75 by using the monitoring ID information included in the image indication information as a key word so as to read out appropriate image data.

Then the device 100 transmits the record data that is read out to the information processing device 200 that is a source of the image acquisition request data (step S504).

Further, after the device 100 transmits the record data, the device 100 determines whether the execution of deletion processing for transmitted data is set up or not (step S506). In the embodiment, since the record data is used by police or the security company, the execution of the deletion processing is set up.

Therefore, original data of the record data that is transmitted is deleted from the recording medium 75 (step S508 and step S510).

If the image recording device 100 to which the device 200 transmits the image acquisition request data transmits the record data (local image data) to the information processing device 200, the device 200 receives the record data (step S606) and stores the data in the HDD 86 (step S608).

Police or the operator of the security company executes an analysis processing with respect to the local image data that is stored in the HDD 86 of the information processing device 200 as necessary and informs the analysis result by telephone or transmits the result to other external information processing device.

As the analysis processing, for example, if a type or a color of a vehicle of a hit-and-run driver or a snatcher is known, a pattern matching with respect to the image data is executed. Persons related to police or the security company check whether the local image data shows the same vehicle as the vehicle of the criminal based on the analysis result.

In a case where the data shows the same vehicle, the persons related to police or the security company predict a traveling destination or traveling time of the vehicle, and form a cordon or set new photographing condition data with respect to vehicles around the predicted traveling destination.

As described above, in the image managing system 1 of the embodiment, since not only information of a photographing location but also information of a photographing time are set in the image recording device 100 as the photographing conditions, the system 1 can allow the image recording device 100 to photograph an image only when the photographing conditions are satisfied and record image data obtained by the photographing.

Accordingly, since only the image data of the image photographed in an intended area at intended time can be recorded in the recording medium 75, storage capacity can be prevented from being compressed by unnecessary image data and a trouble of eliminating the unnecessary data can be saved.

Further, the image recording device 100 of the embodiment predicts an occurrence of an accident from change of acceleration that is acquired from the acceleration sensor 72. In a case where the device 100 predicts that an accident occurs, the device 100 can photograph an image at a predetermined time and record image data obtained by the photographing in the recording medium.

Accordingly, the device 100 can record the image data that can be evidence in an occurrence of an accident likewise a known drive recorder.

The image recording device 100 of the embodiment can record the location corresponding image data obtained by providing the location information to the image data and record the photographing content information as an index in a manner allowing the photographing content information to correspond to the location corresponding image data.

Accordingly, desired image data can be easily detected from the image data recorded in the recording medium 75.

The information processing device 200 can acquire desired image data from the image recording device 100 so as to store the data in the HDD, and execute the analysis processing with respect to the image data that is stored. Further, the information processing device 200 can transmit the protection request for the image data that is recorded in the image recording device 100 so as to allow the image recording device 100 to impose an access limitation on the desired image data. Furthermore, the information processing device 200 transmits an update request of the photographing condition data with respect to the image recording device 100 so as to be able to allow the device 100 to update the photographing condition data.

Thus, the information processing device 200 that is remotely positioned can control the photographing processing of the image recording device 100 and manage the image data that is recorded in the image recording device 100.

The photographing condition data of the embodiment corresponds to the photographing condition information in any one of the second, fourth, and sixth aspects. The GPS module 70 of the embodiment corresponds to the location information acquisition unit of the second aspect. The RTC 52 of the embodiment corresponds to the time information acquisition unit of the second aspect. The camera module 73 of the embodiment corresponds to the photographing unit of any one of the second, fourth, and sixth aspects. The ROM 77 that stores photographing condition data corresponds to the photographing condition information storing unit of any one of the second and fourth aspects. The photographing control unit 10 in the embodiment corresponds to the photographing control means of the second aspect. The image recording unit 12 of the embodiment corresponds to the image recording means of the second aspect. The reception processing of the image acquisition request data executed by the request data receiving unit 13 and the transmission processing of the image data executed by the image data transmitting unit 14 of the embodiment correspond to the image data transmitting means of the second aspect.

The access control processing, which is executed by the request data receiving unit 13 and the access controlling unit 16, for the image data that is recorded in the recording medium 75 in the embodiment corresponds to the access limitation means of the second aspect. The transmitted data deleting unit 15 of the embodiment corresponds to the record data deleting means of the second aspect. The velocity detector 71 of the embodiment corresponds to the migration velocity information acquisition unit of the second aspect. The acceleration sensor 72 of the embodiment corresponds to the operation information acquisition unit of the second aspect.

The accident predicting unit 11 of the embodiment corresponds to the accident predicting means of the second aspect. The photographing condition data updating unit 17 of the embodiment corresponds to the photographing condition updating means of the second aspect.

The image acquisition request data transmitting unit 20 of the embodiment corresponds to the image acquisition request transmitting means of the second aspect. The image data receiving unit 21 of the embodiment corresponds to the image data receiving means of the second aspect. The protection request data transmitting unit 23 of the embodiment corresponds to the protection request transmitting means of the second aspect. The photographing condition updating request data transmitting unit 24 of the embodiment corresponds to the update request transmitting means of the second aspect. The storage processing in which the image data is stored in the HDD 86 in the image data receiving unit 21 corresponds to the image data storing means.

The step S100 of the embodiment corresponds to the step (e) of the fourth aspect or the step (o) of the sixth aspect. The step S102 of the embodiment corresponds to the step (f) of the fourth aspect or the step (p) of the sixth aspect. The step S104 through the step S122 of the embodiment correspond to the step (g) of the fourth aspect or the step (q) of the sixth aspect. The step S300 through the step S312 of the embodiment correspond to the step (h) of the fourth aspect or the step (r) of the sixth aspect. The step S406 of the embodiment corresponds to the step (j) of the fourth aspect or the step (t) of the sixth aspect.

In the above embodiments the image recording device 100 is communicably coupled to the information processing device 200 through the radio communication module 74 so as to execute image data transmission, access control, and update of the photographing condition data in accordance with various request data from the information processing device 200. However, the image recording device 100 may be used in a single body such that the communication I/F 55 and the radio communication module 74 are detached and a detachable card type memory or an HDD are used as the recording medium 75.

In this case, a user brings the image of the image data recorded by the image recording device 100 back home and plays the data by his or her personal computer, for example, so as to view the image or play the data on a monitor (a monitoring window of a car navigation system, for example) provided to a movable body.

In this structure, the photographing condition data corresponds to the photographing condition information of the first aspect. The GPS module 70 corresponds to the location information acquisition unit of the first aspect. The RTC 52 corresponds to the time information acquisition unit of the first aspect. The camera module 73 corresponds to the photographing unit of the first aspect. The ROM 77 that stores the photographing condition data corresponds to the photographing condition information storing unit of the first aspect. The photographing control unit 10 corresponds to the photographing control means of the first aspect. The image recording unit 12 corresponds to the image recording means of the first aspect.

In the above embodiment, the image recording device 100 transmits the image data that is recorded in the recording medium 75 to the information processing device 200 in accordance with the image acquisition request data from the information processing device 200. However, the image data may be automatically transmitted to the information processing device 200 at each record of the image data. In this case, the original data of the transmitted image data may be automatically deleted from the recording medium 75.

The entire disclosure of Japanese Patent Application No: 2007-314371, filed Dec. 5, 2007 is expressly incorporated by reference herein.

What is claimed is:

1. An image recording device that records image data in a recording medium, comprising:
   a photographing unit capable of photographing an image so as to provide the image data;
   a location information acquisition unit for acquiring location information;
   a time information acquisition unit for acquiring time information;
   a photographing condition information storing unit that stores photographing condition information including information of an area in which an image is photographed and information of a period of time in which the image is photographed;
   photographing control means that allows the photographing unit to photograph an image when it is determined that current location information acquired by the location information acquisition unit and current time information acquired by the time information acquisition unit satisfy a condition shown in the photographing condition information stored in the photographing condition information storing unit; and
   image recording means that records local image data, the local image data being obtained by the photographing, in the recording medium in a manner allowing the local image data to correspond to recording content information including information of an area in which the photographing is executed and time information acquired by the time information acquisition unit in a photographing period,
   wherein the photographing control means allows the photographing unit to end the photographing when at least one of the current location information acquired by the location information acquisition unit and the current time information acquired by the time information acquisition unit disagrees with a condition shown in the photographing condition information, and
   wherein the image recording means records the image data as the recording content information in a manner allowing information including information of an area in which the photographing is executed and information, the information being acquired by the time information acquisition unit, of starting time and ending time of the photographing to correspond to the image data.

2. An image managing system, comprising:
   a movable body equipped with an image recording device, the image recording device including a photographing unit capable of photographing an image and recording image data obtained by the photographing by the photographing unit in a recording medium; and
   an information processing device managing the image data that is recorded in the image recording device,
   wherein the image recording device and the information processing device are data-communicably coupled to each other through a predetermined communication line,
   wherein the image recording device includes: a location information acquisition unit for acquiring location information; a time information acquisition unit for acquiring time information; a photographing condition information storing unit that stores photographing condition information including information of an area in which an image is photographed and information of a period of time in which the image is photographed; photographing control means that allows the photographing unit to photograph an image when it is determined that current location information acquired by the location information acquisition unit and current time information acquired by the time information acquisition unit satisfy a condition shown in the photographing condition information stored in the photographing condition information storing unit; image recording means that records local image data, the local image data being obtained by the photographing, in the recording medium in a manner allowing the local image data to correspond to recording content information including information of an area in which the photographing is executed and time information obtained by the time information acquisition unit in a photographing period; and image data transmitting means that transmits the local image data, the local image data being recorded by the image recording means, through the predetermined communication line in accordance with an acquisition request for the local image data, the acquisition request data being received from the information processing device through the predetermined communication line, and wherein the information processing device includes: image acquisition request transmitting means that transmits the acquisition request for the local image data to the image recording device through the predetermined communication line; image data receiving means that receives the local image data transmitted from the image recording device through the predetermined communication line; and image data storing means that stores the local image data that is received, wherein the photographing control means allows the photographing unit to end the photographing when at least one of the current location information acquired by the location information acquisition unit and the current time information acquired by the time information acquisition unit disagrees with a condition shown in the photographing condition information, and wherein the image recording means records the image data as the recording content information in a manner allowing information including information of an area in which the photographing is executed and information, the information being acquired by the time information acquisition unit, of starting time and ending time of the photographing to correspond to the image data.

3. The image managing system according to claim 2, wherein the acquisition request includes photographing content information.

4. The image managing system according to claim 2,
wherein the image recording device includes access limitation means that imposes an access limitation with respect to record data recorded in the recording medium in accordance with a protection request that is received from the information processing device through the predetermined communication line and is an indication request of protection with respect to the record data, and
wherein the information processing device includes protection request transmitting means that transmits the protection request to the image recording device through the predetermined communication line.

5. The image managing system according to claim 3, wherein the image recording device includes record data deleting means that deletes record data recorded in the recording medium, after the record data on which the access limitation is imposed is transmitted.

6. The image managing system according to claim 2, wherein the image recording device includes a migration velocity information acquisition unit for acquiring information of a migration velocity of the movable body, and the photographing control means controls a frame rate in the photographing by the photographing unit based on the information of the migration velocity that is acquired by the migration velocity information acquisition unit.

7. The image managing system according to claim 2, wherein the image recording device includes an operation information acquisition unit for acquiring operation information according to an operation of the movable body and accident predicting means that predicts an occurrence of an accident with respect to the movable body based on the operation information acquired by the operation information acquisition unit; the photographing control means allows the photographing unit to photograph an image in a predetermined period of time when the accident predicting means predicts an occurrence of an accident; and the image recording means records accident prediction image data, the accident prediction image data being obtained by the photographing, in the recording medium in a manner allowing the accident prediction image data to correspond to at least location information acquired by the location information acquisition unit and time information acquired by the time information acquisition unit.

8. The image managing system according to claim 2,
wherein the image recording device includes update request receiving means that receives an update request of the photographing condition information through the predetermined communication line, and photographing condition updating means that updates the photographing condition information stored in the photographing condition information storing unit in accordance with the update request received at the update request receiving means, and
wherein the information processing device includes update request transmitting means that transmits an update request of the photographing condition information including an update content of the photographing condition information to the image recording device through the predetermined communication line.

9. The image managing system according to claim 2, wherein the movable body is a vehicle, the information processing device is managed by police, information on an area in which the photographing is executed includes information on an area in which a crime rate is relatively high, and information on a period of time in which the photographing is executed includes information on a period of time in which a crime rate is relatively high.

10. An image recording control program executed in an image recording device including: a photographing unit that is capable of photographing an image; a photographing condition information storing unit that stores photographing condition information including information of an area in which an image is photographed and information of a period of time in which the image is photographed; and a micro computer, and recording image data obtained by the photographing by the photographing unit in a recording medium, comprising:
a program for allowing the micro computer to execute a processing including:
(a) acquiring location information;
(b) acquiring time information;
(c) photographing-controlling so as to allow the photographing unit to photograph an image when it is determined that current location information acquired in the step (a) and current time information acquired in the step (b) satisfy a condition shown in the photographing condition information stored in the photographing condition information storing unit; and (d) recording local image data, the local image data being obtained by the photographing, in the recording medium in a manner allowing the local image data to correspond to recording content information including at least information of an area in which the photographing is executed and time information obtained in the step (b) in a photographing period, wherein the program allows the photographing unit to end the photographing when at least one of the current location information acquired by the program and the current time information acquired by the program disagrees with a condition shown in the photographing condition information, and wherein the program records the image data as the recording content information in a manner allowing information including information of an area in which the photographing is executed and information, the information being acquired by the program, of starting time and ending time of the photographing to correspond to the image data.

11. An image recording control program executed by an image recording device in an image managing system including a movable body and an information processing device, the movable body being equipped with the image recording device, the image recording device including: a photographing unit that is capable of photographing an image; a photographing condition information storing unit storing photographing condition information including information of an area in which an image is photographed and information of a period of time in which an image is photographed; and a micro computer, and recording image data obtained by the photographing by the photographing unit in a recording medium, and the information processing device managing the image data that is recorded by the image recording device and being data-communicably coupled to the image recording device through a predetermined communication line, comprising:

a program for allowing the micro computer to execute a processing including:

(e) acquiring location information;

(f) acquiring time information;

(g) photographing-controlling so as to allow the photographing unit to photograph an image when it is determined that current location information acquired in the step (e) and current time information acquired in the step (f) satisfy a condition shown in the photographing condition information stored in the photographing condition information storing unit;

(h) recording local image data, the local image data being obtained by the photographing by the photographing unit, in a recording medium in a manner allowing the local image data to correspond to content information including at least information of an area in which the photographing is executed and time information acquired in the step (f) in a photographing period;

(i) receiving an acquisition request of the local image data from the information processing device through the predetermined communication line; and (j) transmitting the local image data recorded in the step (h) through the predetermined communication line in accordance with the acquisition request that is received in the step (i), wherein the program allows the photographing unit to end the photographing when at least one of the current location information acquired by the program and the current time information acquired by the program disagrees with a condition shown in the photographing condition information, and wherein the program records the image data as the recording content information in a manner allowing information including information of an area in which the photographing is executed and information, the information being acquired by the program, of starting time and ending time of the photographing to correspond to the image data.

12. An image recording control method used in an image recording device including a photographing unit that is capable of photographing an image and a photographing condition information storing unit storing photographing condition information including information of an area in which an image is photographed and information of a period of time in which an image is photographed, and recording image data obtained by the photographing by the photographing unit in a recording medium, comprising:

(k) acquiring location information;

(l) acquiring time information;

(m) photographing-controlling so as to allow the photographing unit to photograph an image when it is determined that current location information acquired in the step (k) and current time information acquired in the step (l) satisfy a condition shown in the photographing condition information stored in the photographing condition information storing unit; and (n) recording local image data, the local image data being obtained by the photographing, in the recording medium in a manner allowing the local image data to correspond to recording content information including at least information of an area in which the photographing is executed and time information obtained in the step (l) in a photographing period, allowing the photographing unit to end the photographing when at least one of the current location information and the current time information disagrees with a condition shown in the photographing condition information, and recording the image data as the recording content information in a manner allowing information including information of an area in which the photographing is executed and information, the information being acquired by the time information acquisition unit, of starting time and ending time of the photographing to correspond to the image data.

13. An image recording control method used in an image recording device in an image managing system that includes: a movable body and an information processing device, the movable body being equipped with the image recording device, the image recording device including a photographing unit that is capable of photographing an image and a photographing condition information storing unit storing photographing condition information including information of an area in which an image is photographed and information of a period of time in which an image is photographed, and recording image data obtained by the photographing by the photographing unit in a recording medium, and the information processing device managing the image data that is recorded by the image recording device and being data-communicably coupled to the image recording device through a predetermined communication line, comprising:

(o) acquiring location information;

(p) acquiring time information;

(q) photographing-controlling so as to allow the photographing unit to photograph an image when it is determined that current location information acquired in the step (o) and current time information acquired in the step (p) satisfy a condition shown in the photographing condition information stored in the photographing condition information storing unit;

(r) recording local image data, the local image data being obtained by photographing by the photographing unit, in a recording medium in a manner allowing the local image data to correspond to recording content information including at least information of an area in which the photographing is executed and time information acquired in the step (p) in a photographing period;

(s) receiving an acquisition request of the local image data from the information processing device through the predetermined communication line; and (t) transmitting the local image data recorded in the step (r) through the predetermined communication line in accordance with the acquisition request that is received in the step (s), allowing the photographing unit to end the photographing when at least one of the current location information acquired by the location information acquisition unit and the current time information acquired by the time information acquisition unit disagrees with a condition shown in the photographing condition information, and recording the image data as the recording content information in a manner allowing information including information of an area in which the photographing is executed and information, the information being acquired by the time information acquisition unit, of starting time and ending time of the photographing to correspond to the image data.

* * * * *